US009438930B2

(12) United States Patent
Milstein

(10) Patent No.: US 9,438,930 B2
(45) Date of Patent: *Sep. 6, 2016

(54) SYSTEMS AND METHODS FOR WAVELET AND CHANNEL-BASED HIGH DEFINITION VIDEO ENCODING

(71) Applicant: Exaimage Corporation, Los Angeles, CA (US)

(72) Inventor: Jaime Milstein, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/004,526

(22) Filed: Jan. 22, 2016

(65) Prior Publication Data

US 2016/0205413 A1    Jul. 14, 2016

Related U.S. Application Data

(63) Continuation of application No. 14/261,946, filed on Apr. 25, 2014, now Pat. No. 9,277,216, which is a continuation of application No. 13/007,670, filed on Jan. 17, 2011, now Pat. No. 8,750,383.

(51) Int. Cl.

| | |
|---|---|
| *H04N 19/635* | (2014.01) |
| *H04N 19/169* | (2014.01) |
| *H04N 19/122* | (2014.01) |
| *H04N 19/132* | (2014.01) |
| *H04N 19/18* | (2014.01) |
| *H04N 19/146* | (2014.01) |
| *H04N 19/154* | (2014.01) |
| *H04N 19/156* | (2014.01) |
| *H04N 19/80* | (2014.01) |

(52) U.S. Cl.
CPC .......... *H04N 19/635* (2014.11); *H04N 19/122* (2014.11); *H04N 19/132* (2014.11); *H04N 19/146* (2014.11); *H04N 19/154* (2014.11); *H04N 19/156* (2014.11); *H04N 19/18* (2014.11); *H04N 19/1887* (2014.11); *H04N 19/80* (2014.11)

(58) Field of Classification Search
CPC ... H04N 19/63; H04N 19/122; H04N 19/132
USPC .................................................... 375/240.19
See application file for complete search history.

(56) References Cited

U.S. PATENT DOCUMENTS

| | | | |
|---|---|---|---|
| 7,031,535 B2* | 4/2006 | Yamamoto | ......... H03H 17/0202 348/398.1 |
| 7,936,824 B2* | 5/2011 | Lee | ........................ H04N 19/62 375/240.19 |

*Primary Examiner* — Jamie Atala
*Assistant Examiner* — Nguyen Truong
(74) *Attorney, Agent, or Firm* — Cotman IP Law Group, PLC

(57) ABSTRACT

A wavelet transform (WT) is applied to a data stream of high definition video frames, each comprising one or more data channels digitally representing the same image. A WT is applied to each channel. Visual-quality preserving data filters and data substitution techniques are selectively applied that typically lead to at least 90-to-1 compression of the final encoded video frame. Image edge data is extracted and preserved and image noise is reduced to enhance compressibility. After the first WT, primarily low frequency (LL) image data is retained. With each later WT, more non-LL data is retained. Temporal sequences of LL images that result from the final iteration of the wavelet transform are compressed by means of a chain of invertible differenced images. Any color space can be used. Cross-channel conditional substitution is applicable. Complete multi-resolution scalability is incorporated into the encoded product. Extra-high definition video encoding is also achievable.

20 Claims, 16 Drawing Sheets

SYSTEMS AND METHODS FOR WAVELET AND CHANNEL-BASED HIGH DEFINITION VIDEO ENCODING

CROSS-REFERENCE TO RELATED APPLICATIONS

The present application is a continuation of U.S. patent application Ser. No. 14/261,946, filed on Apr. 25, 2014, which is a continuation of U.S. patent application Ser. No. 13/007,670, filed on Jan. 17, 2011, specifications of which are herein incorporated by reference in their entirety.

BACKGROUND OF THE INVENTION

1. Field of the Invention

Embodiments of the invention described herein pertain to the field of computer systems. More particularly, but not by way of limitation, one or more embodiments of the invention enable systems and methods for wavelet-based standard 1080p-high definition and extra-high definition multi-dimensional and channel-based video encoding.

2. Description of Related Art

Video may be stored in digital form. In its uncompressed state, digital video exists as a series of images, or video frames. High definition digital video in its uncompressed state usually involves so much data that it must immediately be either consumed or compressed for transmission or storage, for later decompression and consumption. This problem is resolved with the help of a video encoder that compresses the video to a fraction of its original size. At playback time, with the help of a general or special purpose digital processing device, a corresponding video decoder decompresses and reconstructs the video for display. The success of this process depends on the amount and kind of data lost in the compression process; the size, resolution, and frame rate of the display; the available computer resources; and the efficiency of the decoder. The first and last of these issues depend on the video encoder and decoder, i.e., the video codec.

Over the years, the meaning of 'high definition' video, implying higher than ordinary resolution viewing, increased until its meaning was standardized. Standard high definition (HD) modes include 720p (1,280×720), 1080i (1,920×1,080 interlaced), 1080p (1,920×1,080). Extra HD modes have emerged, including 2K (2,048×1,536), 2160p (3,840×2,160), 4K (4,096×3,072), 2540p (4,520×2,540), and 4320p (7,680×4,320).

Video compression is useful to improve transmission speed, reduce storage size, reduce required bandwidth, and improve video quality. Video compression and decompression techniques affect digital video transmission. Some video compression techniques result in digital video files that are streamable (i.e., may be transmitted, decompressed, and displayed in real time). Video compression may employ lossless or lossy data compression techniques. Lossy data compression can affect video quality.

The primary issue in video encoding is achieving adequate video compression to satisfy transmission bandwidth and storage media limitations, without too severely compromising visual quality.

Existing video codecs must often trade off viewing quality to satisfy high definition standards, memory limitations and, especially, communication bandwidth limitations. The trade-space available to satisfy these requirements is limited for codecs based on the discrete cosine transform (DCT). Today's conventional method for encoding video uses the DCT to transform the video signal from the image domain to the frequency domain. Such frequency-domain video compression is used in such standards as MPEG-2, MPEG-4, Windows Media, and H.264 standard codecs. Because the DCT is suitable only for very small blocks of data, an HD video frame must be partitioned into thousands of distinct DCT blocks, a major processing challenge for the decoder, which must somehow make block boundaries invisible to the viewer. Moreover, such codecs also require motion prediction for further compression in the time domain, using motion vectors relative to key frames (e.g., 1-frames). Such a process makes random access to non-key frames a time-intensive process and makes it difficult to do video editing. Even primary colors are de-correlated to satisfy compression requirements. There are many implementations but only one DCT transform. The DCT has been fully exploited for video applications. As industry struggles with DCT-based codecs to satisfy even the rudimentary 1280×720p HD standard, with 4320p imminent, there is no clear path to achieving the compression and quality demanded by extra-high definition video.

Wavelet transforms have been applied to compression for still images (e.g., JPEG 2000), but video codecs using wavelets have been found to be too slow and too lacking in viewing quality to be practical even for many non-HD video applications. Wavelets have been used inefficiently in video codecs (slowing down the decoder) and/or ineffectively (taking only limited advantage of their potential and producing video of inferior quality). These kinds of implementation problems have discouraged any significant use of wavelets in practical applications and have prevented any use of wavelets in HD or 3-D video applications. Indeed, existing techniques do not provide compression required for today's standard HD video, nor do they address the loss of video quality typical of wavelet-based codecs.

There is a need for systems and methods for wavelet-based standard high definition and extra-high definition two and three-dimensional channel-based video encoding that overcomes these issues.

BRIEF SUMMARY OF THE INVENTION

One or more embodiments of this invention achieve very high HD quality-preserving compression, in part, by extensive use of sophisticated conditional and unconditional replacement of a large proportion of wavelet coefficients generated by the wavelet transform (WT). There are two kinds of wavelet coefficients: 'preview' coefficients and 'support' coefficients. Most replacement and compression occurs among support coefficients, which may constitute over 95% of the data.

External specifications are applied and internal parameters are defined that help determine whether a conditional replacement will occur and what the replacement value will be. Classes of functions are introduced into the video encoding process for the first time. Collectively, the internal parameters that may include these and other functions act as a kind of virtual control system that the encoder consults as needed.

In the course of compressing video frame data, special filters are applied prior to the WT in order to enhance the effectiveness of these compression techniques. These compression techniques are designed to retain video quality in spite of very high losses of support data during the encoding process. Distinctive wavelet-based techniques and filters are used to capture, retain, and separately encode data most critical to video quality that might otherwise be lost. One or more filters are also applied that eliminate noise that would otherwise interfere with compression of support data. The WT may then be applied to the video frame one or more times. The encoding process allows for the replacement and compression of all support data generated by the first WT application. Each successive application of the WT increases the ratio of support data to preview data by a factor of four, further enhancing opportunities for compression.

One or more embodiments of the invention differ from conventional efforts to achieve multi-frame compression: instead of using motion prediction of video frame images, increased compression comes from, for example, direct comparison operations on nearby video frame images or images derived from their wavelet transforms. One or more embodiments include a multi-frame method that involves matching blocks of image data in multiple frames, then uniformly replacing the image data in one of the blocks. One or more embodiments involve multi-frame methods that include calculating differences either between support data after applying a WT to an image or between images before applying a WT to a difference image. One or more embodiments use another multi-frame technique, one that replaces support data in one image channel whenever corresponding support data in another image channel falls below a threshold value.

Most encoders are forced to convert red/green/blue (RGB) color video to a particular color space such as YCbCr in order to achieve needed compression. This requires resources of the decoder to convert back to RGB and can reduce the viewing quality of the displayed video. One or more embodiments of this invention require no such conversion and are equally well suited to work with any desired color representation. It may use multiple color spaces, including a new color space, in special ways that further enhance compression of wavelet coefficients. In fact, each data channel, whether or not a color component, is just another data representation of the same image, independent of any other interpretation. This independence simplifies encoding for false color and hyper-dimensional color displays. Other embodiments use certain color spaces for high performance transformation.

An ongoing problem that video codec providers face is that of scalability—the need to provide video to users with differing display resolutions and aspect ratios. Existing codecs have been able to provide only the most primitive kind of scalability, such as a rigid choice between three or four fixed alternatives. One or more embodiments of the invention encode data with improved multi-resolution scalability for the range of screen sizes and aspect ratios, for example, from cell phone displays to full HD, and even beyond, to extra-high definition 4K. One or more embodiments encode three-dimensional high definition video.

One or more embodiments of systems and methods for wavelet and channel-based high definition video encoding are directed to a tangible computer-readable medium comprising computer-readable instructions for wavelet and channel-based high definition video encoding.

In one or more embodiments, a compression ratio of the compressed output data is at least about 90:1 while preserving HD video quality at a resolution of at least 1920×1280p and a frame rate of at least 24 fps. One or more embodiments encode HD video to the best quality non-HD screens are capable of displaying.

Execution of the computer-readable instructions by one or more processors causes the one or more processors to carry out steps that may include obtaining a digital video data stream comprising a plurality of video frames comprising at least one data channel represented as a numerical array. A data channel may include a color channel or a non-color data channel.

Execution of the computer-readable instructions by one or more processors may cause the one or more processors to carry out steps including selecting a wavelet transform to apply to at least one selected video frame selected from the plurality of video frames. In one or more embodiments, the wavelet transform is selected from $D(2i)$, where $i$ is an integer greater than or equal to 2.

Execution of the computer-readable instructions by one or more processors may cause the one or more processors to carry out steps including recursively applying the wavelet transform n times to the at least one channel of the at least one selected video frame to generate wavelet space data comprising level k preview data and level k support data for each of the at least one selected video frame, where the wavelet transform is recursively applied to the preview data, where $n$ is an integer greater than 0 and where $k=1, 2, \ldots, n$.

Execution of the computer-readable instructions by one or more processors may cause the one or more processors to carry out steps including performing at least one conditional data substitution operation on at least support channel on at least one level in wavelet space. In one or more embodiments, the at least one conditional data substitution operation includes zero substitution.

In one or more embodiments, the computer-readable instructions further include agile variation of at least one parameter to achieve at least one of a target compression, a target viewing quality, a system performance target, or a resource limitation target, where the at least one parameter is dynamically changeable between frames during processing of the plurality of video frames. In one or more embodiments, the at least one parameter may include at least one of a wavelet transform type, a number of iterations, and a color space.

In one or more embodiments, the at least one data substitution operation includes replacing at least one value in the level k support data for at least one channel, where the replacing the at least one value with a replacement value is based on k and the at least one value. In one or more embodiments, replacing at least one value is further based on at least one of a desired viewing quality input value and a desired data compression value.

In one or more embodiments, replacing at least one value is further based on a value of at least one channel data functional. The at least one channel data functional may include at least one channel comparison measurement. The at least one channel data functional may include, for example, at least one of biaxial coefficients and mean square adjacency change values.

In one or more embodiments, the at least one data substitution operation that includes replacing at least one value may be based on a color space of at least one of the plurality of video frames, and the current channel. In one or more embodiments, replacing at least one value may also be further based on its position in a support array of the channel and the values at the corresponding position in corresponding support arrays of other channels.

In one or more embodiments, the computer-readable instructions further include monitoring at least one control system input related to at least one of compression and viewing quality, where at least one parameter of the computer-readable instructions is dynamically modified based on the at least one control system input. The at least one control system input may be selected from peak signal-tochange ratio, sequential video frame superposition, and biaxial correlation coefficients.

In one or more embodiments, the computer-readable instructions further include the use of a filter for edge restoration. The use of a filter for edge restoration may include iteratively applying the wavelet transform of a video frame n times to obtain preview and support spaces, modifying support space data to maximize compression without regard to loss of edge support data, iteratively applying inverse wavelet transform k times to said preview, $0<k\leq n$, and said modified support spaces to obtain modified level (n–k) image, generating a pixel-by-pixel difference frame between the original level (n–k) image and the modified level (n–k) image, modifying the difference image by applying at least one edge preserving filter that replaces the values of non-boundary points in said difference frame in order to generate an edge data array, and comprising output data from encoding of said preview, said compressed support spaces, and compressed edge data array, so that the modified level (n–k) image with improved edges is recoverable by decoding the output data and performing pixel-by-pixel summation of the decoded modified level (n–k) image and the decoded edge array.

Execution of the computer-readable instructions by one or more processors may cause the one or more processors to carry out steps including performing at least one conditional substitution operation that may be based on a level-dependent threshold, where the level-dependent threshold decreases monotonically as k increases.

In one or more embodiments, the computer-readable instructions further include replacing all level 1 support data with zeroes.

Execution of the computer-readable instructions by one or more processors may cause one or more processors to carry out steps including performing at least one conditional data substitution operation on level l image space data, where $0\leq l\leq n$, in order to increase compression of support space data.

In one or more embodiments, the computer-readable instructions further include applying a filter to a level l image, where l is an integer, prior to the application of a wavelet transform in order to improve compression obtained by applying the at least one substitution operation on level l+1 support data obtained by applying the wavelet transform to the level l preview.

The computer-readable instructions may include applying a static subframe mosaic algorithm to determine at least one subarray in a same position in the plurality of temporally close video frames to further compress the plurality of temporally close video frames.

In one or more embodiments, the computer-readable instructions further include performing multi-frame compression on the wavelet space data corresponding to a plurality of temporally close video frames. The computer-readable instructions may include computing differences between level 1 support data of two temporally close video frames.

In one or more embodiments, at least one value of at least one position in a level k wavelet space of a channel of a video frame is replaced with a second value corresponding to the at least one position in a second channel of the video frame. The computer-readable instructions may include transforming at least one plurality of video frames to an alternate color space. The computer-readable instructions may include channel support compositing involving channels from a plurality of color spaces. The computer-readable instructions may include hyper-dimensional channel encoding.

In one or more embodiments, the computer readable instructions further include minimizing the number of multiply operations during color space conversion by transforming at least one plurality of video frames to a color space with transformation coefficients comprising sums of dyadic fractions.

In one or more embodiments, the compressed output data includes a single scalable multi-resolution encoding of the digital video data, where multiple resolutions, screen sizes, and aspect ratios are obtainable from the compressed output data.

In one or more embodiments, execution of the computer readable instructions by one or more processors further include encoding a means for a decoder to define at least one value in a level k support space for a video frame treated as a level k preview, where k is an integer.

Execution of the computer-readable instructions by one or more processors may cause the one or more processors to carry out steps including generating compressed output data comprising level n preview data and at least one level k support data, where a decoder configured to apply at least one inverse wavelet transform to the compressed output data generates a video stream.

One or more embodiments of systems and methods for wavelet-based high definition video encoding are directed to a tangible computer-readable medium comprising compressed video data. The compressed video data includes level n preview data and at least one level k support data.

In one or more embodiments, the compressed video data is generated by obtaining a digital video data stream comprising a plurality of video frames comprising at least one channel represented as a numerical array.

In one or more embodiments, the compressed video data is generated by selecting a wavelet transform to apply to at least one selected video frame selected from the plurality of video frames.

In one or more embodiments, the compressed video data is generated by recursively applying the wavelet transform n times to the at least one channel of the at least one selected video frame to generate wavelet space data comprising level k preview data and level k support data for each of the at least one selected video frame. The wavelet transform may be recursively applied to the preview data, where n is an integer greater than 0 and where k=1, 2, . . . , n.

In one or more embodiments, the compressed video data is generated by performing at least one conditional data substitution operation on at least one level k support data in wavelet space.

In one or more embodiments, the compressed video data is generated by generating compressed output data comprising level n preview data and at least one level k support data, where a decoder configured to apply at least one inverse wavelet transform to the compressed output data generates a video stream.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

As used herein, the term "video encoder" refers to any device, software, or combination thereof capable of encoding a plurality of video frames.

As used herein, the term "video decoder" refers to any device, software, or combination thereof capable of generating a plurality of video frames from encoded data.

As used herein, the term "video codec" refers to any device, software or combination thereof capable of encoding and later decoding video comprising a plurality of video frames.

As used herein, the expression "high definition video encoding" refers to the ability to encode video up to and including standard 1920×1080p high definition at 24 fps. Thus, "high definition video encoding" includes the ability to encode non-high definition video. For each current video standard, there are one or more embodiments of systems and methods for wavelet and channel-based high definition video encoding that satisfy that video encoding standard.

As used herein, the term "support datum" refers to at least one value in the at least one level k support of an image in wavelet space. As used herein, the term "support data" refers to at least one point and the value of said point in a support array of at least one level of one channel of a video frame.

As used herein, the term "threshold" refers to a function θ, the value of which is compared to data to determine whether to replace that data with a constant (usually zero) value or leave the data unchanged. The threshold function may depend on one or more of the following values: the spatial position (i,j) of the data, the WT level, target and estimated compression, target and estimated visual quality, data channel, etc. A threshold is sometimes referred to as "constant" if its value is independent of data position.

Systems and methods for wavelet and channel-based high definition video encoding will now be described. In the following exemplary description, numerous specific details are set forth in order to provide a more thorough understanding of embodiments of the invention. It will be apparent, however, to one of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims and the full scope of any equivalents are what define the metes and bounds of the invention.

Figure 1:
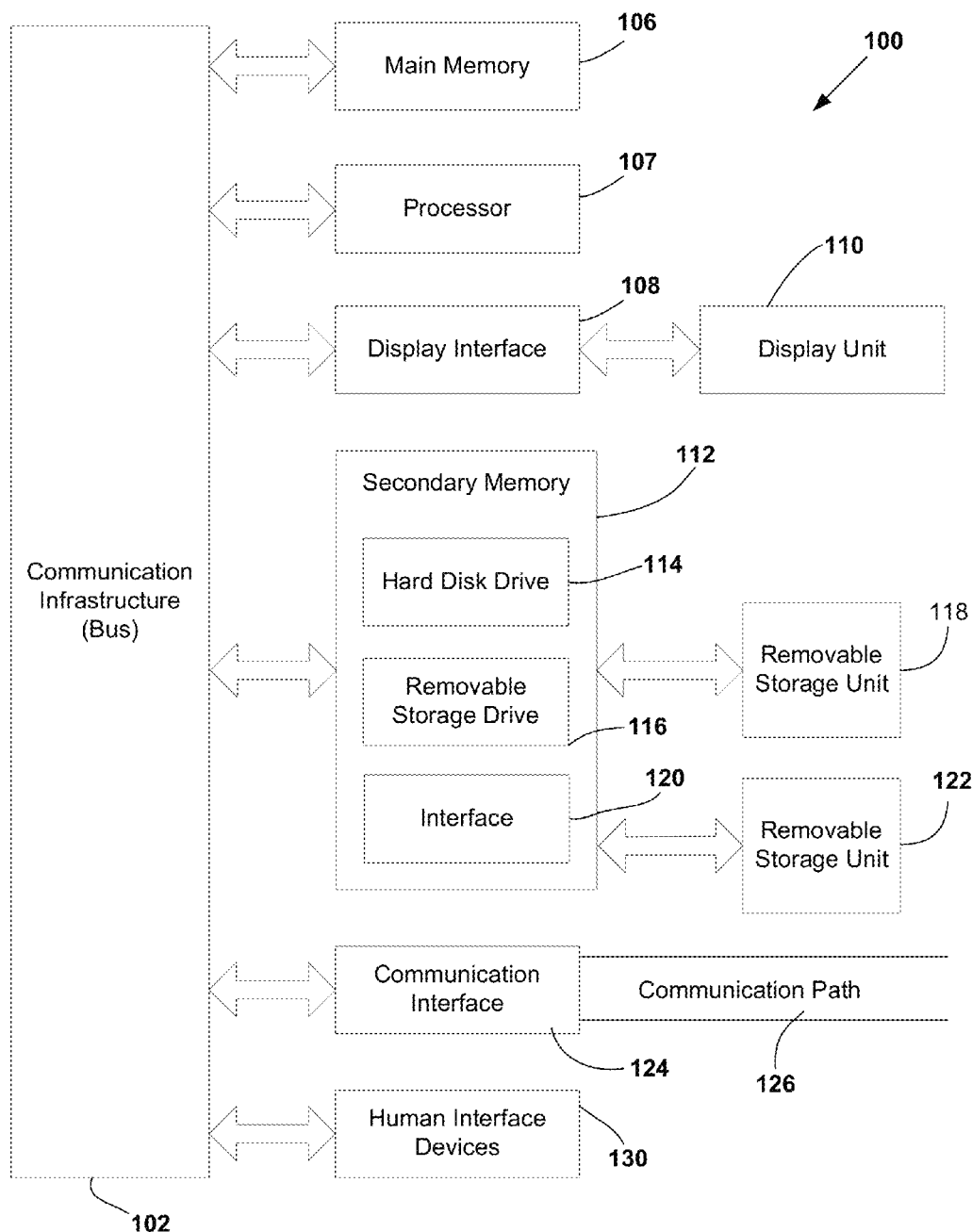
FIG. 1 illustrates a general-purpose computer and peripherals that when programmed as described herein may operate as a specially programmed computer in accordance with one or more embodiments of systems and methods for wavelet and channel-based high definition video encoding.

FIG. 1 diagrams a general-purpose computer and peripherals, when programmed as described herein, may operate as a specially programmed computer capable of implementing one or more methods, apparatus and/or systems of the solution described in this disclosure. Processor 107 may be coupled to bi-directional communication infrastructure 102 such as communication infrastructure system bus 102. Communication infrastructure 102 may generally be a system bus that provides an interface to the other components in the general-purpose computer system such as processor 107, main memory 106, display interface 108, secondary memory 112 and/or communication interface 124.

Main memory 106 may provide a computer readable medium for accessing and executed stored data and applications. Display interface 108 may communicate with display unit 110 that may be utilized to display outputs to the user of the specially-programmed computer system. Display unit 110 may include one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107. Either fixed or removable computer-readable media may serve as secondary memory 112. Secondary memory 112 may include, for example, hard disk 114 and removable storage drive 116 that may have an associated removable storage unit 118. There may be multiple sources of secondary memory 112 and systems implementing the solutions described in this disclosure may be configured as needed to support the data storage requirements of the user and the methods described herein. Secondary memory 112 may also include interface 120 that serves as an interface point to additional storage such as removable storage unit 122. Numerous types of data storage devices may serve as repositories for data utilized by the specially programmed computer system. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A network interface card (NIC) is an example of the type of device that once coupled to communication infrastructure 102 may provide a mechanism for transporting data to communication path 126. Computer networks such Local Area Networks (LAN), Wide Area Networks (WAN), wireless networks, optical networks, distributed networks, the Internet or any combination thereof are some examples of the type of communication paths that may be utilized by the specially program computer system. Communication path 126 may include any type of telecommunication network or interconnection that can transport data to and from communication interface 124.

To facilitate user interaction with the specially programmed computer system, one or more human interface devices (HID) 130 may be provided. Some examples of HIDs that enable users to input commands or data to the specially programmed computer may include a keyboard, mouse, touch screen devices, microphones or other audio interface devices, motion sensors or the like, as well as any other device able to accept any kind of human input and in turn communicate that input to processor 107 to trigger one or more responses from the specially programmed computer are within the scope of the system disclosed herein.

While FIG. 1 depicts a physical device, the scope of the system may also encompass a virtual device, virtual machine or simulator embodied in one or more computer programs executing on a computer or computer system and acting or providing a computer system environment compatible with the methods and processes of this disclosure. Where a virtual machine, process, device, or otherwise performs substantially similarly to that of a physical computer system, such a virtual platform will also fall within the scope of disclosure provided herein, notwithstanding the description herein of a physical system such as that in FIG. 1.

One or more embodiments are configured to enable the specially programmed computer to take the input data given and transform it into a web-based use interface (UI) by applying one or more of the methods and/or processes described herein. Thus the methods described herein are able to transform a stored component into a web UI, using the solution disclosed here to result in an output of the system as a web UI design support tool, using the specially programmed computer as described herein.

Wavelet Transform (WT) Usage

A wide variety of multi-dimensional wavelet transforms is known in the art, some of which vary in mathematical detail as well as the comparative quality of their results when used as a basis for a video codec. In order to clarify concepts without needless complexity, wavelet transforms defined by Ingrid Daubechies in *Ten Lectures on Wavelets*, SIAM, 1992 are used herein in one or more embodiments of systems and methods of wavelet and channel-based high definition encoding. Most references to a wavelet transform (WT) or inverse wavelet transform (IWT) would be applicable, mutatis mutandis, to other WTs and IWTs, including WTs applicable to imagery of three spatial dimensions or more. One of ordinary skill in the art would recognize that the systems and methods of wavelet and channel-based high definition encoding described herein also apply to other wavelet transforms, including but not limited to non-Daubechies wavelet transforms WTs of two or more dimensions.

Starting with a video frame of 2m pixel-columns and 2n pixel-rows, let the value of each pixel $p(i,j)$, $i=1, \ldots, 2n$, $j=1, \ldots, 2m$, be a K-dimensional vector of real numbers $<p_1(i,j), \ldots, p_K(i,j)>$, $a_k \leq p_k(i,j) < b_k$, where K a positive integer, and $a_k$, $b_k$ fixed real numbers, $k=1, \ldots, K$.

As used herein, the expression "data channel" refers to a single-component data array that describes an image. For example, an image may be a picture, a drawing, a page of text, a road map, an infrared photograph, an x-ray, a star chart, or virtually any other multidimensional array of data interpretable for human visual perception. (The concept of "data channel" will be extended after wavelet transform has been described in greater detail.) Thus, each pixel is a K-dimensional description of a point in a two or three-dimensional depiction of an image, and each data channel constitutes a one-dimensional description of the image.

Processing Multi-Channel Images

A K-channel N-spatial dimensional image is essentially a (K+N) dimensional structure. In one or more embodiments of systems and methods of wavelet and channel-based encoding, the image itself has three spatial dimensions, that is the image is '3-D', and N=3. One of ordinary skill in the art would recognize that there are different ways for said systems and methods to process such a structure, including but not limited to the following embodiments:

For each wavelet level, process the N-dimensional image channel-by-channel. In this case, the N-dimensional pixel array may be processed as K single component data arrays, $[p_k(i_1, i_2, \ldots, i_N)]$, $k=1, \ldots, K$.

For each channel, process the N-dimensional image wavelet level-by-wavelet level One of ordinary skill in the art will recognize that the same approach can be used to process 2-dimensional images (i.e., N=2), 3-dimensional images (N=3), and images of any number of spatial dimensions.

Like numbers and other mathematical objects, a data channel in the abstract has no intrinsic non-mathematical meaning. Also like numbers and other mathematical objects, an extrinsic interpretation can be applied. For example, '2+3=5' is an uninterpreted mathematical fact, while '2 km+3 km=5 km' is a fact if numbers are interpreted as kilometers. In this specification, the described concepts are interpreted in the context of image encoding/decoding.

As used herein, the expression "color channel" refers to a data channel the data of which is interpreted as color data. In most video applications, K=3, and the three data channels are color channels. As used herein, the expression "non-color channel" is a data channel that is not interpreted as a color channel.

In one or more embodiments of systems and methods of wavelet and channel-based encoding, red green blue (RGB) images are processed. The color channels are red, green, and blue intensity values and, for example, the pixel vector value $<p_1(i,j), p_2(i,j), p_3(i,j)>=<0, 0, 0>$ represents the absence of color (black) at point (i,j), while $<p_1(i,j), p_2(i,j), p_3(i,j)>=<255, 255, 255>$ represents the brightest white at point (i,j). In one or more embodiments, the value 255 may be replaced by $(2^n-1)$ for any integer n that is convenient for computer representation of color intensity.

As used herein, the term "color space" refers to a representation of colors as vectors of numbers. Thus, a three dimensional color space can be represented on three data channels. For the YCbCr color space, channel 1 values may represent luminance, and channel 2 and 3 values may represent chroma. For a black and white video, K is typically 1, and pixel values represent shades of gray. This is commonly called a gray scale representation of an image.

In one or more embodiments of systems and methods of wavelet and channel-based high definition encoding, one or more channels to be encoded are non-color data channels. For example, a non-color data channel may represent the height from the earth's surface to the top of the object located at position (i,j) as viewed from a satellite. What is to be noted here is that every data channel, color or non-color, of a video frame depicts the same image, and the processing of a data channel is independent of the interpretation of a channel.

Unless otherwise indicated, as used herein, the expression "pixel value" generally refers to the $k^{th}$ component value of that pixel for some integer k, $1 \leq k \leq K$, in other words, a single data channel at a time. This is entirely for reasons of simplicity and clarity and has nothing to do with actual programming implementation or the sequencing of programming instructions.

In the following description, consider one data channel of one full sized digitized (2m)×(2n)-pixel video frame. For simplicity, assume that the data channel is interpreted as a gray-scale representation of the video frame image and that the value of each pixel has been quantized to an eight-bit value, that is, a non-negative integer below 256, representing the gray-scale value at that point, with 0 representing darkest black.

Wavelet Space Consisting of Four Quarter Size Isometric Arrays.

In one or more embodiments of a wavelet-based high definition video encoder, a WT transforms a (2m-by 2n) image in four isometric (m-by-n) arrays.

As used herein, the term "quadrant" refers to one of said isometric arrays.

As used herein, the expression "wavelet space" refers to the value of the WT applied to an image. The original image can be recreated if IWT is applied to the wavelet space thus generated. As used herein, the expression "wavelet coefficient" is a point in a wavelet space and its value. Each pixel in the image is a function of a certain wavelet coefficients in said wavelet space.

FIGS. 2A-2B illustrate an exemplary relationship between a pixel in image space and the spatial locations of the points in the wavelet transform space that constitute the support of that pixel in accordance with one or more embodiments of systems and methods for wavelet and channel-based high definition video encoding.

For simplicity, assume that this entire illustration relates to a single data channel, starting with the video frame, and continuing with each level of image, and wavelet space. Thus, every point in image or wavelet space actually retains the same K channels and channel interpretations as those of the original video frame. Each channel is processed independently unless otherwise indicated.

FIG. 2A shows an 8×8 video frame 202, prior to the application of the wavelet transform. FIG. 2B represents the resulting 4×4 arrays of wavelet coefficients. Each array represents a combination of a low or high frequency ("L" or "H") horizontal filter with a low or high frequency (L or H) vertical filter applied to video frame 202. In FIG. 2B the four quadrants happen to be arranged so that the low-low ("LL") quadrant 210 is in the upper left corner, the HL quadrant 212 is in the upper right corner, the LH quadrant 214 is in the lower left corner, and the HH quadrant is in the lower right corner. (The actual arrangement of the four quadrants with respect to one another is arbitrary.) As referred to herein, the term "preview" refers to the LL quadrant, and the term "support quadrants" refers to the other three quadrants. As used herein, the term "support data" refers only to data found in support quadrants.

Figure 2:
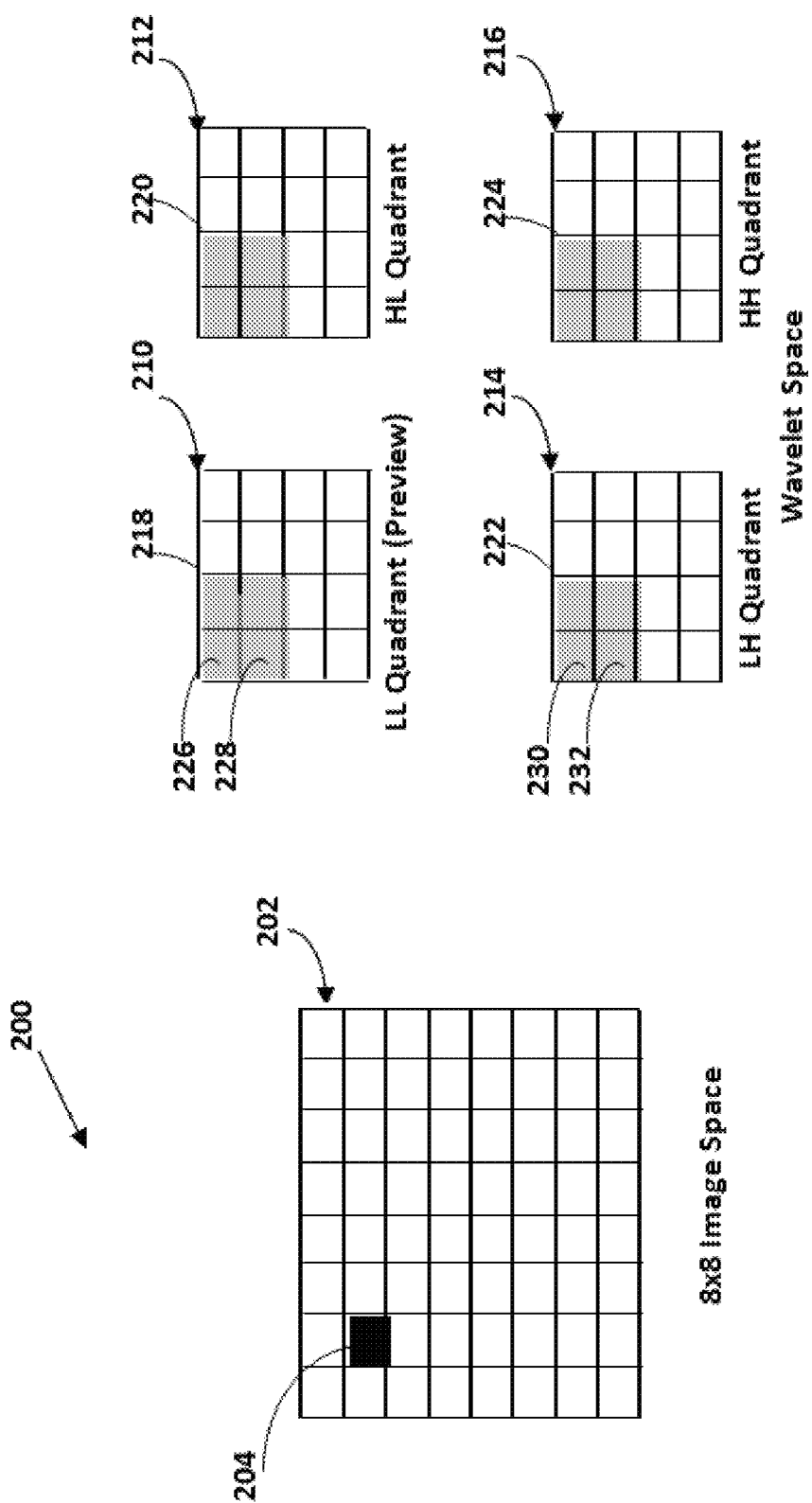
FIGS. 2A-2B illustrate an exemplary relationship between a pixel in image space and the spatial locations of the points in the wavelet transform space that constitute the support of that pixel in accordance with one or more embodiments of systems and methods for wavelet and channel-based high definition video encoding.

If the WT is carried out without simplification or approximation, the inverse wavelet transform (IWT) applied to the data in the support quadrants together with the data in the preview will recreate the pre-transformed image. The Daubechies WT used for this description is a WT, herein referred to as "D4". For said WT D4, each value in the restored image is a mathematical function of the values at exactly sixteen points: in this illustration, a two-by-two square 218 of pixels in the preview, together with two-by-two's located congruently in each of the three support quadrants (220, 222, and 224). In FIG. 2, the 16 values that determine the value of pixel 204 in FIG. 2A are the four sets of wavelet coefficients shown in gray in FIG. 2B at 218, 220, 222, and 224. Mathematically, these are four arrays of wavelet coefficients from which the original image can be recovered by applying the IWT.

Interpreted as an array of wavelet coefficients, the preview is the LL quadrant of the WT of the original image and exists in wavelet space. However, this array may instead be considered a data channel with the same interpretation as the corresponding component channel of the original image. Thus, that same array is an image—a half-resolution version of the corresponding component channel of the original image. Video frames and other images are generally construed as existing in an image space. Interpreted as a data channel of an image, the preview array becomes an image in its own image space, an image to which the WT can be applied to obtain a quarter-quarter size version of the original image, together with three similarly reduced arrays of support data. This is the meaning herein of the expression "iterative" or "recursive" application of the wavelet transform. This dual interpretation of the preview array allows us to refer to a preview as an image and vice versa. Ordinarily, it is harmless to overlook this distinction (as is done in the description of FIG. 3 and FIG. 7). Later, this distinction is found to have important practical consequences.

Iterative Wavelet-Based Processing.

Figure 3:
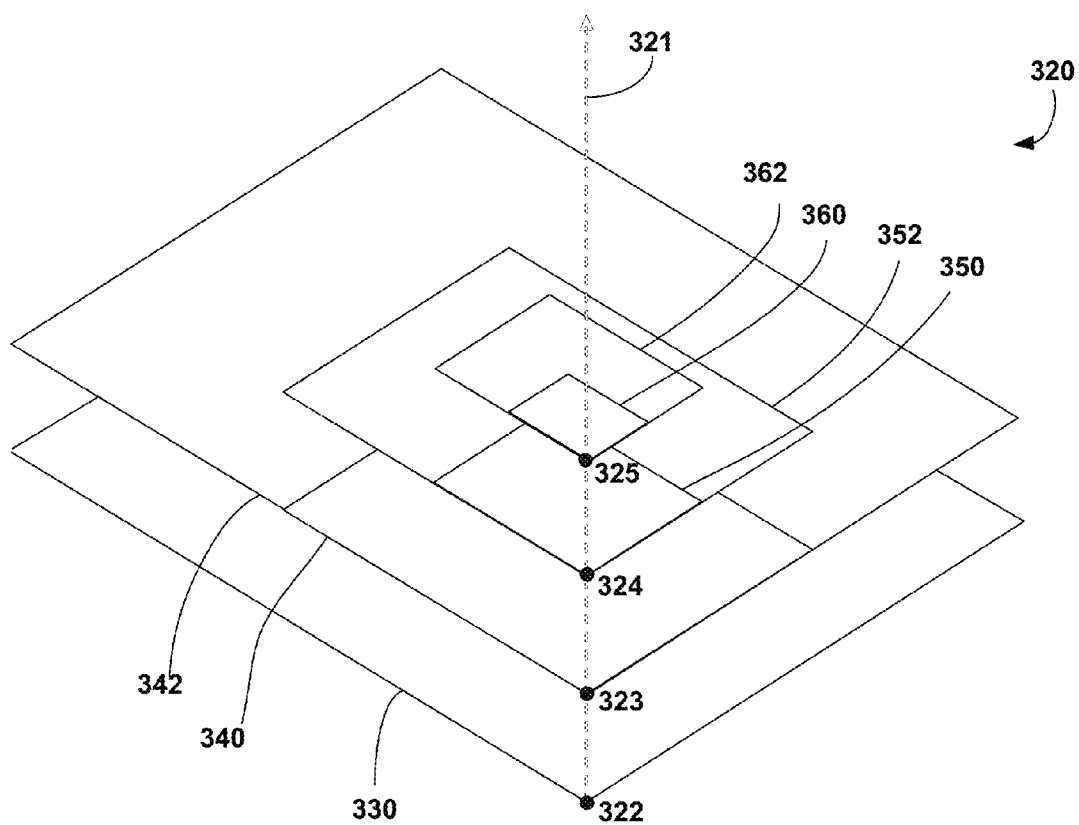
FIG. 3 is an exemplary diagram of wavelet-based processing of a video frame in accordance with one or more embodiments of a wavelet-based codec in accordance with one or more embodiments of systems and methods for wavelet and channel-based high definition video encoding.
Figure 7:
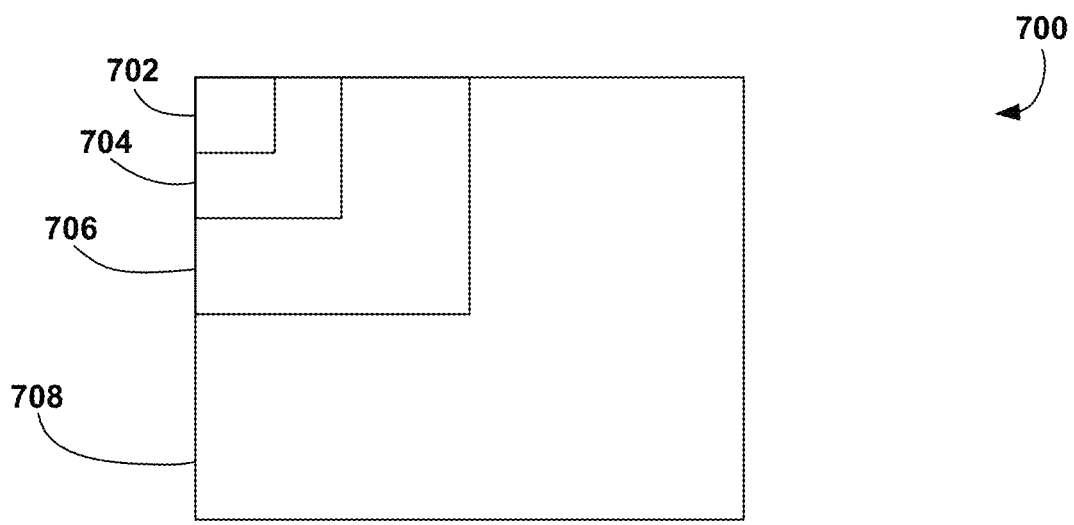
FIG. 7 is an exemplary diagram of wavelet-based processing of a video frame in accordance with one or more embodiments of a wavelet-based codec in accordance with one or more embodiments of systems and methods for wavelet and channel-based high definition video encoding.

FIG. 3 and FIG. 7 illustrate exemplary wavelet-based processing of a video frame in accordance with one or more embodiments of a wavelet and channel-based video codec in accordance with one or more embodiments of systems and methods for wavelet-based high definition video encoding. In one or more wavelet-based codecs, a wavelet transform (WT) is applied to a video frame to generate preview data and support data. The WT is applied iteratively to each successive preview (i.e., preview arrays interpreted as image data channels) to generate the next level wavelet space. As used herein, the original video frame is referred to as the "level 0 image". As used herein, for l greater than zero, the expression "level l image" refers to the image obtained by interpreting level l preview coefficients as image data. Let L be the number of times the WT has been recursively applied to the original video frame. Then the encoded video consists of the level L wavelet space (i.e., level L preview along with the level L support quadrants), together with level l support quadrants from each lower level, l=L−1, . . . , 1.

The decoding process begins with the highest level preview data and the highest level support data. For each level l, starting with l=L, the IWT is applied iteratively to the level l preview data and the level l support data to generate the level (l−1) image until the approximation of the original level 0 image is created. Without good preview data to start with, only an extremely poor level 0 image can be reproduced. The WT and the IWT may be performed in a lossless manner, or the WT may be configured to concentrate essential data in preview data such that support data may be more highly compressed while minimizing negative effects on perceived video quality in decoded data.

FIG. 7 illustrates a representation of exemplary data required to decode a video frame using the IWT. Although FIG. 7 shows IWT data 700 required to decode a video frame after encoding involving three iterations of the WT, one of ordinary skill in the art will recognize that the number of iterations can be varied without departing from the spirit or the scope of the invention.

IWT data 700 includes level 1 support data 708 generated by applying the WT to the level 0 image data (e.g., the video frame). IWT data 700 further includes level 2 support data 306 generated by applying the WT on the level 1 preview data. IWT data 700 further includes level 3 support data 704 generated by applying the WT on the level 2 image data. IWT data 700 further includes level 3 preview data 702, also generated by applying the WT on the level 2 preview data. In exemplary IWT data 700, level 3 support data 704 and level 3 preview data 702 are the highest level wavelet space data generated by the iterative application of the WT by a video encoder.

In one or more embodiments, the video encoder uses lossy compression on at least a portion of IWT data 700. For each level l, there is a threshold below which support data is replaced for 704-708. This threshold may decrease as l increases, resulting in greater data compression of lower level support data.

FIG. 3 illustrates the generation of support data and preview data over multiple iterations of applying the WT. Although three iterations of the WT are shown, one of ordinary skill in the art will recognize that the number of iterations can be varied without departing from the spirit or the scope of the invention.

Iterative process 320 illustrates data generated by applying the WT at steps 322-325, where direction 321 shows the order of operation. At step 322, input data is obtained. The input data corresponds to the level 0 image data 330 (i.e., the video frame). At step 323, after a first WT is applied to the level 0 preview data 330, level 1 image data 340 and level 1 support data 342 are generated. At step 324, after a second WT is applied to the level 1 preview data 340, level 2 image data 350 and level 2 support data 352 are generated. At step 325, after a third WT is applied to the level 2 preview data 350, level 3 preview data 360 and level 3 support data 362 are generated. In exemplary iterative process 320, the level 3 preview 360 is the highest level preview generated by applying the WT iteratively.

Use of D4 as the Wavelet Transform.

In one or more embodiments of the systems and methods for wavelet and channel-based high definition video encoding, the D4 WT is used. One of ordinary skill in the art would recognize that D6, D8, or any other D2i (i>1) WT may be used without departing from the spirit or the scope of the invention. The choice of WT and the two vectors of convolution coefficients determine low and high frequency filters and the exact nature of the WT. (Convolution coefficients are not to be confused with the wavelet coefficients they help generate.) Convolution coefficients can be specified to have many different properties, each of which affects the nature and quality of the outcome.

To determine the value at a single point of the D4 WT of an image, functions of the form $(c_0 x_0 + c_1 x_1 + c_2 x_2 + c_3 x_3)$ are applied, where $<c_0, c_1, c_2, c_3>$ is one of two pre-selected vectors of coefficients and $<x_0, x_1, x_2, x_3>$ is a vector of four properly-positioned pixels. These four-term sums of products are the convolutions referred to in the previous paragraph.

The D4 WT has a property common to many WTs that goes far in explaining why a substitution in support space tends to have little impact on the final viewing quality of the decoded image. As seen in FIG. 2, the value of a pixel in level (k—1) is a mathematical function of 16 points in level k, only four of which are in the level k preview. Yet, the value of the level (k−1) image depends much more heavily on the value of those four level k preview coefficients than on all twelve support space coefficients. Therefore, a change in a support space value is likely to have a very limited impact on any image pixel that depends on it.

Figure 5:
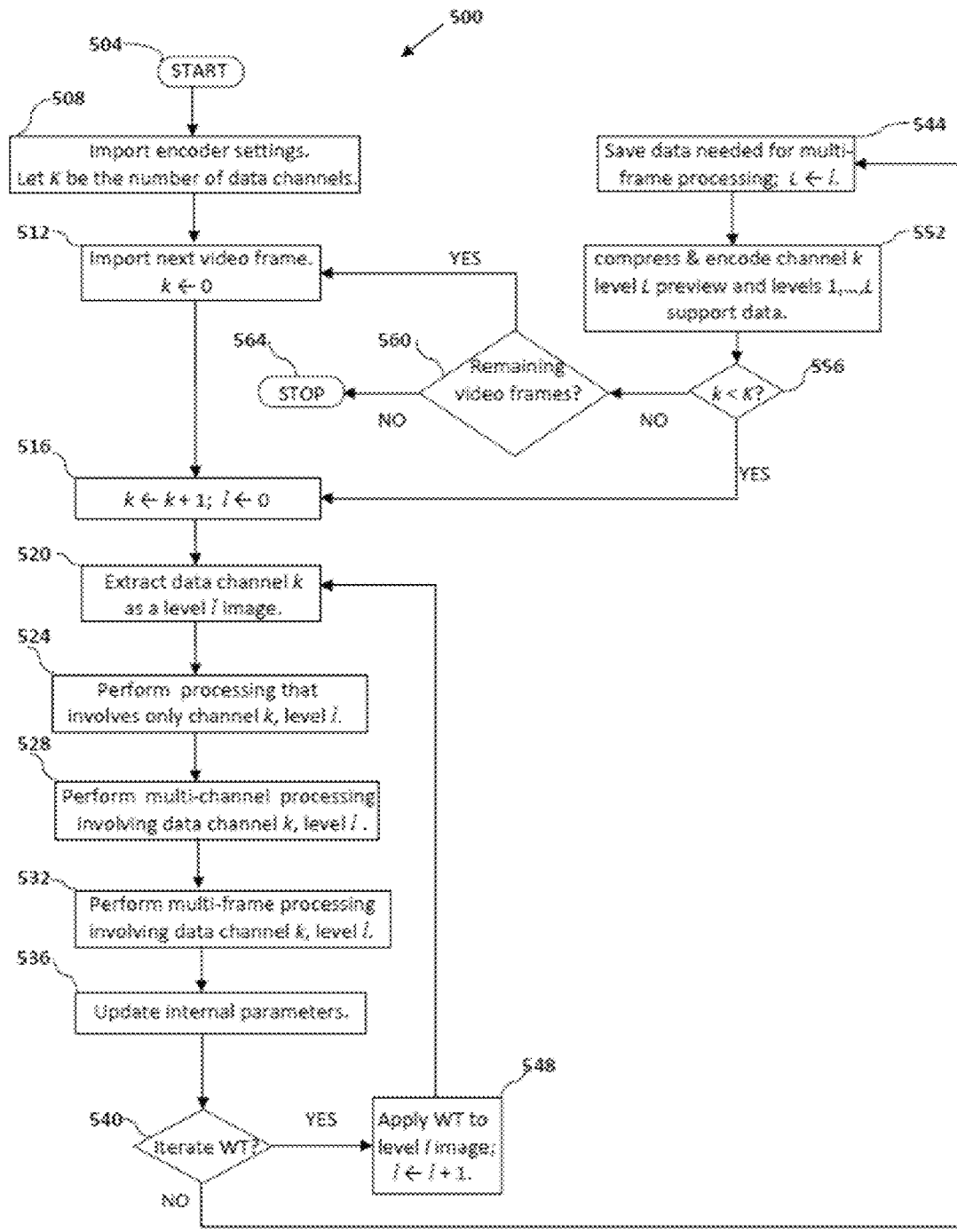
FIG. 5 is a high level flowchart of one or more embodiments of the wavelet-based high definition encoder in accordance with one or more embodiments of systems and methods for wavelet and channel-based high definition video encoding.

FIG. 5 is a high level flowchart of one or more embodiments of the wavelet-based high definition encoder in accordance with one or more embodiments of systems and methods for wavelet and channel-based high definition video encoding. One or more embodiments of said system accept user or operator requirements to establish system operating constraints, targets, and initial values of processing parameters, referred to herein as "external settings". Said external settings may take into account bandwidth limitations, required data compression, desired video fidelity, geometry of user's display, etc. In one or more embodiments of systems and methods for wavelet and channel-based high definition video encoding, the system evaluates additional parameters for internal purposes. Said additional parameters are referred to herein as "internal parameters". As previously stated, a digital video frame includes at least one image data channel. Processes may involve a single data channel, including a non-color data channel, a single video frame, or a plurality of video frames, and processes may occur on any level of image space data or wavelet space data.

FIG. 5 is a flowchart exemplifying processing video frames in accordance with one or more embodiments of systems and methods for wavelet and channel-based high definition video encoding.

Procedure 500 starts at step 504. Processing continues to step 508, where a level 1 image is obtained. The flowchart 500 in FIG. 5 starts with step 504 and proceeds to step 508, where external settings are imported and the number K of data channels comprising a video frame is set.

Processing continues to step 512, where the encoder then imports the first remaining video frame, and the value of k is initialized at k=0.

Processing continues to step 516, where k is incremented by one, and the level number l is initialized at l=0.

Processing continues to step 520, where the encoder is prepared to process data channel k, level l image, that is, the video frame as a level 0 image or the level l preview as a level l image, for l>0.

Processing continues to step 524, where the encoder performs all processing that involves only the current data channel.

Processing continues to step 528, where the encoder performs all multi-channel processing within the current frame that involves a plurality of the current channel and at least one previously considered data channel.

Processing continues to step 532, where the encoder performs all level l multi-frame and multi-channel processing that involves a plurality of the current data channel, previously considered data channels and at least one previously considered video frame.

Processing continues to step 536, where internal parameters are updated. These parameters are evaluated and updated as determined by the wavelet channel-based high definition encoder At other steps in the flowchart the encoder may use such parameters along with other external or computed data to determine whether a conditional replacement occurs, whether a filter is applied, what the threshold of a filter is set at, etc.

Processing continues to step 540, where a decision is made as to whether to perform a wavelet transformation on the level l preview treated as a level l image. If YES, then processing returns to step 520. Otherwise, processing continues to step 544, where a wavelet transform is applied to the level l image to obtain the level (l+1) preview and level (l+1) support data. The value of l is incremented by one, and processing continues to step 520, where next-level channel data is extracted.

Processing continues to step 548, where any data that may be required for multi-frame processing is saved, and the value of L is set to the current value of l.

Processing continues to step 552, where the wavelet coefficients of the level L preview and support spaces for levels 1 through L are compressed and encoded, as is any image data of any level that may be needed for decoding processes.

Processing continues to step 556, where the value of k is tested. If k<K, then there are still unprocessed channels, and the encoder returns to step 516. Otherwise, the encoder proceeds to step 560.

In step 560, a decision is made: if additional video frames remain to be processed, the encoder returns to step 512 to start processing the next video frame. Otherwise, the encoder has completed its task and stops with step 564.

One of ordinary skill in the art will recognize that there are many different ways of sequencing and modifying the processing steps shown in FIG. 5.

Several methods and examples of wavelet and channel-based high definition video encoding are described in the following sections, each of which is used in one or more embodiments of the systems and methods of wavelet and channel-based high definition video encoding.

Data Substitution and Internal Parameters

Conditional data substitution plays a critical role in achieving the amount of compression essential to a wavelet-based high definition video encoder. The best opportunity for visual-quality preserving compression lies in simplifying wavelet support space in ways that optimize such data compression techniques as run length encoding (RLE) and sparse matrix encoding that occur in the final stage of encoding. A good way to simplify the support space for compression is to substitute long runs of the same value, but only if this data distortion ('loss') does not significantly degrade image quality. For this reason, most such substitutions must be conditioned upon various factors known to assure quality retention.

Prior to substitution, the most common values found in support spaces for actual images are zero and values very near to zero. Thus, zero is the most promising substitution for compression because it is the value most likely to lengthen constant value runs for RLE compression. Also, the more zero replacement has occurred, the more additional compression is likely to benefit from further zero replacement. For these reasons, several applications of substitution in one or more embodiments of systems and methods for wavelet and channel-based high definition video encoding involve zero replacement.

In general, there is wide variety of functions that can provide the condition for making a substitution in support space, including the value or position of the data itself. The next section describes some functions that may be used for this and other purposes in one or more embodiments of systems and methods for wavelet and channel-based high definition video encoding.

Use of Internal Parameters

In one or more embodiments of the systems and methods for wavelet and channel-based high definition video encoding, one or more internal parameters are evaluated. These internal parameters include both conventional and unconventional functions and may be used by the encoder in various ways. A conditional substitution may be made, the value of the substitution may be set, the application of a filter may be skipped, filter thresholds may be computed, etc., depending on the value of one or more internal parameters.

As used herein, the term "measurand" refers to a dimension of measurement (e.g., length, temperature, velocity, etc.). An internal parameter may be the value of a measurand or a function of values comprised of measurands. Many measurands used in one or more embodiments of the systems and methods for wavelet and channel-based high definition video encoding are defined, most of whose use and function within a video encoder are distinctive in form or meaning.

Some measurands and classes of measurands are now described, each of which is used in one or more embodiments of systems and methods for wavelet and channel-based high definition video encoder.

Internal and External Compression Parameters

Encoder video compression may be evaluated as the ratio between the input video bit rate and encoded video bit rate. For streaming video, compression ratio is inversely related to required bandwidth, which is the quotient of input video rate and compression. The HD standard, the video frame rate, and the compression factor, together, determine the bandwidth requirement that the encoder must satisfy. Thus, in one or more embodiments, compression targets and evaluations can play a major role in encoder performance.

In one or more embodiments, the tangible computer readable medium tests internal parameters representing compression measurements or estimates to determine whether and how much more compression is desired during the course of processing one or more video frames. Depending on its use in this regard, compression may be measured or estimated over a single video frame, a recent sequence of video frames, all video frames processed thus far, or the complete video.

In one or more embodiments of the systems and methods for wavelet and channel-based high definition video encoding, target compression is an external setting, and compression measurements are used to ensure that the encoder performs satisfactorily.

For example, adequate compression maintenance may be achieved by conditioning one or more substitutions or filter operations upon such values as the difference between the external target compression rate setting and the measured compression rate of the encoder.

Viewing quality is an important issue for video. Typically, 'video viewing quality' really amounts to video viewing fidelity, that is, the faithfulness of the subjective experience of viewing the displayed video to that of viewing the original video.

Functionals for Defining Quality Measures

Functionals constitute one class of functions that help in defining useful quality measures. As used herein, the term "functional" refers to a real-valued function. For example, the distance between two points, video compression rate, and all statistical measures are functionals. As used herein, the term "channel functional" refers to a real-valued function evaluated on the data of one or more the data channels, not necessarily in the same video frame. Three common difference measures are now defined, each of which is a functional: (a) Sum absolute difference (SAD), (b) Mean square (MS) difference and root mean square (RMS) difference, and (c) Peak log signal-to-MS difference ratio (PR).

If $S=(s_i, i=1, \ldots, n)$ and $T=(t_i, i=1, \ldots, n)$ is a pair of sequences, then the sum absolute difference between S and T is $$SAD(S,T)=\Sigma_{i=1,\ldots,n}|t_i-s_i| \quad (1)$$

and RMS difference is $$RMS(S,T)=\sqrt{[(1/n)\Sigma_{i=1,\ldots,n}(t_i-s_i)^2]} \quad (2)$$

Another useful functional defined partly in terms of RMS difference is the 'peak ratio' (PR) functional, $$PR(S,T)=10 \log_{10} [(\max_i\{s_i,t_i\})/\text{MS difference of } S \text{ and } T] \quad (3)$$

Anyone skilled in the art can readily find many variants of these formulas, such as mean absolute difference, etc. Also, one skilled in the art will recognize their two dimensional generalizations, where $S=[s_{i,j}]$, $T=[t_{i,j}]$, m×n matrices; then $$SAD(S,T)=\Sigma_{i=1,\ldots,m}\Sigma_{j=1,\ldots,n}|t_{i,j}-s_{i,j}| \quad (4)$$

$$RMS(S,T)=\sqrt{[(1/mn)\Sigma_{i=1,\ldots,m}\Sigma_{j=1,\ldots,n}(t_{i,j}-s_{i,j})^2]} \quad (5)$$

and the two-dimensional analogue of Eq. (3), $$PR(S,T)=10 \log_{10} [(\max_{i,j}\{s_{i,j},t_{i,j}\})^2/\text{MS difference of } S \text{ and } T] \quad (6)$$

If S and T are channel data arrays, then Eq. (4), (5), and (6) are channel functionals.

It is well known that existing objective models and measures of viewing fidelity at best only approximate the subjective human viewing experience. In fact, the most common such measures often yield paradoxical results compared with subjective video viewing, especially for high definition video. For that reason, multiple measures continue to be investigated. All such measures seem image-based—that is, they compare a pre-processed video frame to the post-processed video frame.

The most widely accepted video quality measure is peak signal-to-noise ratio (PSNR), which performs a pixel by pixel comparison of a pair of corresponding image channels for the preprocessed image S and post-processed image T. PSNR uses the formula $$PSNR(S,T)=PR(S,T) \quad (7)$$

where S is a data channel in the original video frame and T is the corresponding data channel in the decoded video frame. PSNR seems a reasonable measure of image fidelity because, as its name suggests, it is a measure of pixel-by-pixel coincidence between the two images. However, PSNR is known to render anomalous results and is therefore an untrustworthy estimator of viewing quality.

A superior measure of viewing quality, the SSIM (structural similarity) index, is described by Wang and Bovik. [Z. Wang, A. C. Bovik, H. R. Sheikh and E. P. Simoncelli, "Image quality assessment: From error visibility to structural similarity," *IEEE Transactions on Image Processing*, vol. 13, no. 4, pp. 600-612, April 2004.] For square images [x] and [y], SSIM(x,y) is defined $$SSIM(x, y) = \frac{(2\mu_x\mu_y + c_1)((2\sigma_{xy} + c_2)}{(\mu_x^2 + \mu_y^2 + c_1)(\sigma_x^2 + \sigma_y^2 + c_2)}, \quad (8)$$

where $c_1=(k_1L)^2$, $c_2=(k_2L)^2$, L is the dynamic range of pixel values, $k_1=0.01$, and $k_2=0.03$.

These and other measures of video quality are image-based and fail to account for the subjective difference between viewing an image and viewing a video. When viewing a video, the eye never actually perceives an individual image, only sequences of images over some minimal duration of time. Moreover, video is not a random sequence of images but a sequence of subsequences of closely related images. To the viewer, each subsequence typically appears to be a continuous, extended view from a single stationary or moving perspective. Only in this context can the brain interpolate continuous motion from the sequence of images that pass before the eye. For the video viewer to 'see' a feature found in a still image, that feature must persist in multiple frames and be interpolated by the brain as having an enduring existence. Thus, a great deal of transient 'noise' can exist in each video frame without significantly degrading the video viewing experience. At the same time, comparatively minor artifacts can persist, be perceived, and degrade the viewing experience.

Image-based video quality measures cannot be expected to yield reliable estimates of subjective video fidelity. A new class of measures is defined herein. The essential idea is that the measure is defined in terms of a plurality of preprocessed frames and their post-processed counterparts rather than a single preprocessed frame and its post-processed counterpart.

An effective video quality measure of this kind is used in one or more embodiments of systems and methods for wavelet and channel-based high definition video encoding. Such a video quality measure can be used to represent both a target visual quality value and the estimated achieved visual quality value. Compression can then be modulated to ensure that the product of the encoder does not depart too greatly from the target viewing quality.

One or more embodiments of systems and methods for wavelet and channel-based high definition video encoding utilize these functionals in the operation of a video encoder, including but not limited to the exemplary functional described below. Each functional described below plays a valuable role in one or more embodiments of wavelet and channel-based high definition video encoding.

Autocorrelation Coefficient.

Consider the data channels $S=[s_{i,j}]$ (i=1, ..., m−1; j=1, ..., n), and $S'=[s_{i+1,j}]$ (i=1, ..., m−1; j=1, ..., n). A channel functional, sometimes referred to as the autocorrelation coefficient, is defined:

$$AC(S)=PR(S,S') \quad (9)$$

This autocorrelation coefficient is a measure of how 'busy' an image is. In general, the lower the autocorrelation coefficient, the more the image changes as it is scanned from left to right or vice versa, and the more highly detailed. For that reason, an autocorrelation coefficient may be used to determine how frequently certain local tests or processes must be performed on an image.

Biaxial Correlation Coefficients.

Now consider two data channels S and T of the same image. As used herein, the term "biaxial correlation coefficient" (BCC) refers to the value $$BCC(S,T)=PR(S,T) \qquad (10)$$

A BCC quantifies a relationship between two different representations of the same image. For example, the channels could be two of the color components in an RGB representation of the image. For high fidelity video processing (that is, high quality video viewing), the BCC of a processed image should be virtually identical to that of the pre-processed image. For example, the BCC of a pair of color channels of the level k image should be the same as that of the corresponding pair of color channels of the original image. This invariance of the BCC channel functional makes it a candidate quality measurand.

Peak Signal-to-Change Ratio.

Now, consider corresponding data channels S and T in successive video frames or same-level images. The channel functional peak signal-to-change ratio, defined $$PSCR(S,T)=PR(S,T) \qquad (11)$$

is a measure of coincidence of successive images. Of course, the PSCR can be applied to any two same-size images in the video flow. Like the autocorrelation coefficient, PSCR(S,T) may be tested to determine whether compression techniques applicable to S are likely to continue to be applicable to T. To one skilled in the art, other difference functionals suggested by formulas (4) and (5) could play a role similar to that of (6) or be otherwise used advantageously.

Each formula, (7), (9), (10), and (11), is based on the formula PR(S,T). Yet, the meaning and utility of each formula in a video codec is completely different from one another and is distinguished by its use in a codec.

Each of these functionals measures the amount of change within an image channel, cross-channel, within a frame, or from one video frame to another. For that reason, as referred to herein, the expression "change functionals" refers to said functionals and other such functionals.

One or more embodiments of the systems and methods for wavelet and channel-based high definition video encoding utilize a change functional. One or more of these measurands may be used to repeat compression-enhancing substitutions without requiring additional processing (due to cumulative change over time from previously processed conditions), or quantify the amount of persistence in the video over time (and therefore the sensitivity of that segment of video to persistent artifacts).

In one or more embodiments of the systems and methods for wavelet and channel-based high definition video encoding, one or more video viewing quality measures are employed. For example, adequate estimated video quality may be maintained by conditioning one or more substitutions or filter operations upon such values as the difference between the external target viewing quality setting and the value of the encoder's estimated achieved viewing quality.

One or more embodiments of the systems and methods for wavelet and channel-based high definition video encoding utilize channel interpretation as an internal parameter. A wavelet-based video encoder selects a second color space and, channel by channel, transforms the color data channels to those of another color space, conditioned in part on the current color space. Thus, such data substitution is conditioned in part on the current color space and its data channels.

As used herein, a "primary support channel" refers to a data support channel of the color space currently used to represent image data. As used herein, a "secondary support channel" refers to a support channel of a secondary color space. A secondary color space may or may not be distinct from the primary color space.

One or more embodiments of systems and methods for wavelet and channel-based high definition video encoding utilize cross channel conditional substitution. A zero data substitution in one channel is conditioned on the value of the corresponding data in a second channel. In one or more of said embodiments, a secondary color space has been generated by a color transformation from the color channels of the image. A wavelet transformation has been applied to corresponding color channels of the image. The encoder computes a threshold value θ as a function of level and of the quality and compression internal parameters. For each datum in the secondary support space, if the absolute value of the datum is less than θ, then the value of the corresponding primary support datum is replaced with zero. This technique increases the number of zeroes and therefore the amount of compression without noticeably detracting from viewing quality.

In this section, several applications of conditional substitution have been illustrated. In the course of doing so, exemplary measurands were defined and their use as internal parameters described. In later sections, certain filters and other techniques that further support or enhance compression are described.

Settings and Controls

One or more embodiments of the systems and methods for wavelet and channel-based high definition video encoding involve many conditional operations, ultimately oriented to achieving a good balance between compression-enhancing substitutions and quality-preserving restraint. This is achieved with the help of a sophisticated interplay between external settings, internal parameters, and their use in condition tests, filter settings, and the like. As used herein, the expression "virtual control system" refers collectively to these settings, parameters, evaluations, and operations, construed as an instrument that the tangible computer-readable medium maintains to support its activities.

The computed inputs and outputs of the virtual control system include internal parameters. Internal parameters include but are not limited to at least one value representing achieved compression and at least one value representing estimated subjective visual video fidelity, herein referred to as "quality" or "visual quality". The inputs of the virtual control system include external settings and every value used to compute an internal parameter referenced by the encoder. External settings include target compression and target quality parameters and may include but are not limited to parameters representing operator specifications and end user system resources and requirements.

One or more embodiments of systems and methods for wavelet and channel-based high definition video encoding utilize a virtual control system.

An exemplary control system compatible with one or more embodiments of the systems and methods for wavelet and channel-based high definition video encoding is described below. One of ordinary skill in the art would appreciate that any set of reference functions useful in encoding processes will not depart from the spirit or the scope of the invention, including but not limited to facilitating compression while optimizing trade-offs between compression and estimated visual quality.

Figure 6:
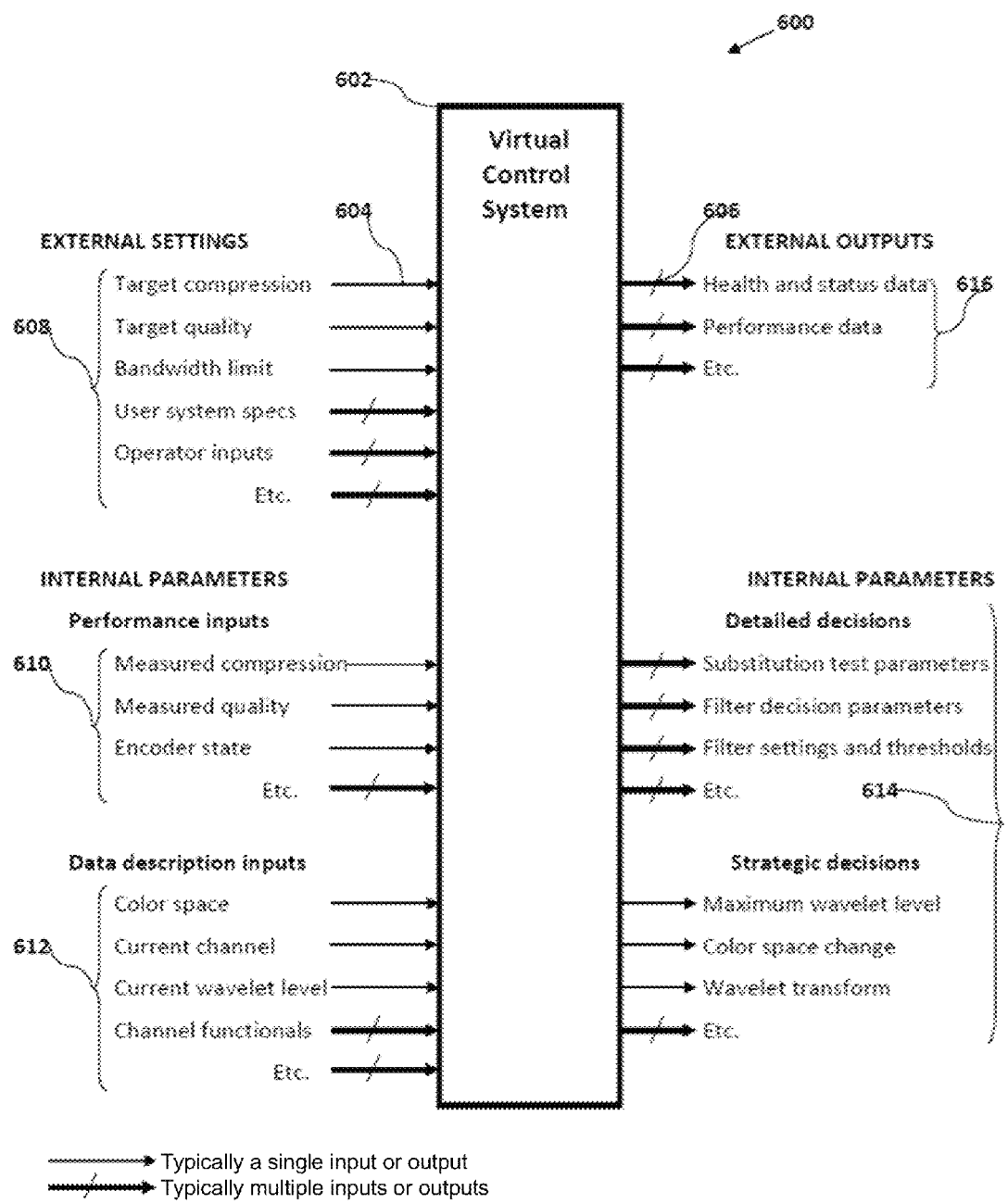
FIG. 6 is an exemplary representation of the control system of one or more embodiments of the wavelet-based high definition encoder in accordance with one or more embodiments of systems and methods for wavelet and channel-based high definition video encoding.

FIG. 6 is an exemplary representation of the control system of one or more embodiments of the wavelet-based high definition encoder in accordance with one or more embodiments of systems and methods for wavelet and channel-based high definition video encoding.

This exemplary representation (600) of a virtual control system 602 includes a particular selection of inputs and outputs.

Some inputs and outputs are construed as individual quantities, suggested by a thin, bare arrow 604. Others represent one or more measurands or quantities, indicated by a thick arrow 606 with a slash through it.

In this exemplary representation, the virtual control system has two sets of inputs: external settings 608 and internal parameters. In this representation, the internal parameter inputs have been further divided into performance inputs 610 and data description inputs 612.

The internal parameters shown as outputs 614 are values the encoder can access as needed in carrying out its function. For example, various substitutions are conditioned upon the value of one or another of these internal parameters. Whether a particular filter operation is to be applied or skipped at some stage of processing depends on the value of a filter decision parameter. Another set of internal parameters provides the threshold settings for threshold filters. Additional strategic outputs include internal variables that specify the number of WT iterations, trigger a change in the color space, or signal a change in the wavelet transform.

One or more exemplary representations of the virtual control system have an additional category of outputs that are not accessed by the encoder. In this embodiment, external outputs are indicated for health and status data and performance data (616).

The virtual control system does not modify the computer-readable instructions for wavelet and channel-based high definition video encoding but is an instrument for enabling the encoder to optimize its product to meet operator objectives.

Agile Variation.

As used herein, "agile variation" refers either to the ability of systems and methods for wavelet and channel-based high definition video encoding to select conditionally from among specific compression methods, filter settings, parameter values, etc., on a frame-by-frame or level-by-level basis, as detailed herein. Such processes include but are not limited to wavelet transform type, number of wavelet iterations, filter selection, color space to be used, etc.

One or more embodiments of the systems and methods for wavelet and channel-based high definition video encoding are configured to use ongoing visual quality estimators, ongoing compression measurements, and/or other measurands attributes to select among such processing options as number of WT recursions, the kind of wavelet transform used, and filter usage on a frame-by-frame and level-by-level basis in order to approach, improve, achieve, or maintain video quality, image compression, throughput requirements, and other factors.

In one or more embodiments, agile variation includes varying the selection of the WT used and the number of iterations to apply the WT on a frame-by-frame basis. In one or more embodiments, agile variation includes varying the selection of the WT between iterations. With respect to the WT applied at any given time, there is a mathematical relationship between the WT used and the effectiveness of various compression techniques, the degree of observable quality loss, processing speed, and other factors. One or more embodiments of the systems and methods for wavelet and channel-based high definition video encoding incorporate algorithms, heuristics, and other computational techniques to use agile variation to improve compression and decompression performance by taking advantage of these relationships.

In one or more embodiments of systems and methods for wavelet and channel-based high definition video encoding, the agile variation of at least one internal parameter identifies data to be eliminated from the support of each level of a video frame.

In one or more embodiments of systems and methods for wavelet and channel-based high definition video encoding, the values of some internal parameters are agile, including threshold settings and conditional functions may change in response to changes in other internal parameters from one frame to another and from one level to another.

Conditional Use of Unconditional Substitution.

In one or more embodiments of the systems and methods for wavelet and channel-based high definition video encoding, the virtual control system may specify the systematic and unconditional substitution of a constant for all support data at a particular level, thus saving the processing time required for testing individual support data. For example, this option may be more extensively triggered for non-HD applications.

In one or more embodiments, zero is the said constant that is substituted.

One or more embodiments use a virtual control system and continuous monitoring in order to maintain visual quality.

For example, one or more embodiments of systems and methods for wavelet and channel-based high definition video encoding are configured to continuously monitor and modify expected viewing quality to maintain a desired standard of viewing quality as part of a control system.

In one or more embodiments, this capability is applied either pre-encoding, during encoding, or during video data transmission, in order to satisfy video quality goals. Correspondingly, these goals may be input to a control system before encoding or during encoding as desired. For an already encoded video, video quality can be reduced to specified quality prior to transmission, or for implementation during decoding stage.

In one or more embodiments of systems and methods for wavelet and channel-based high definition video encoding, user input is accepted on a real-time basis to give a user control over viewing quality in real time.

In one or more embodiments of the systems and methods for wavelet based high definition video encoding, compression and estimated viewing quality are monitored to maintain balance between compression and viewing quality. The two major challenges for the encoder are to compress HD video adequately to satisfy bandwidth constraints and to preserve enough video quality to satisfy the end user. By continuously monitoring encoding compression and estimated viewing quality, compression opportunities are selected so as to minimize quality loss while satisfying bandwidth limitations.

One or more embodiments of systems and methods for wavelet-based high definition video encoding are configured to continuously monitor and modify expected visual quality to maintain a desired standard of visual quality. In one or more embodiments, this capability is applied either pre-encoding, during encoding, or during video data transmission in order to satisfy an estimated visual quality goal.

Correspondingly, in one or more embodiments, this goal may be represented as an external setting before encoding or as an internal parameter during encoding, as desired.

For an already encoded video, video quality can be reduced to a specified quality prior to transmission or for implementation during decoding stage.

Use of Video Frame Superposition within a Scene Shot to Estimate Viewing Quality One or more embodiments of the systems and methods for wavelet and channel-based high definition video encoding are configured to use video frame superposition, including possibly motion-compensated frames, within a scene shot as an alternative quantitative estimate of compression and viewing quality.

As used herein, the term "scene shot" refers any sequence of frames of a video of sufficient duration for conscious intelligible viewing that appears to be shot continuously and exclusively from the same camera. A video may be considered a sequence of scene shots, separated by transitional shots. Successive scene shots are separated by zero or more transitional frames that may not be visually related to the scene shots they separate. Successive frames within the same scene shot are closely related to one another. A scene shot must generally be of some minimal duration of viewing time (MVT) τ for intelligible, conscious viewing. For any fixed frame rate r frames per second, the value τ translates to a minimal number of frames (MVF) φ=rτ necessary for conscious awareness of what is being viewed. (MVT varies from person to person and time to time.)

Consider an exemplary moving weighted average of a sequence of f video frames, f≥φ, within a scene shot, where φ is the MVF as defined as above. Let $F_i$ be frame i within the scene shot and $A_i$ be the weighted average from $F_i$ to $F_{i-f}$. $A_i$ provides a relatively stable platform for such measurement purposes as PSCR and other comparisons between the processed and original video, especially if most motion is occurring against a relatively motionless (or motion-compensated) background.

In one or more embodiments, the weights (wk) form a monotonically decreasing sequence of scalars, where $A_i = w_0 F_i + \ldots + w_f F_{i-f}$ and $\Sigma_{k=0, \ldots, f} w_k = 1$.

One of ordinary skill in the art would appreciate that any composite image may be used, including a simple superposition, a weighted moving average, or any other compositing of any number of sequential or sub-sequential frames, whether preprocessed for motion estimation or in some other way, and whether used consistently or conditionally, without departing from the spirit and the scope of the invention.

Single Frame Compression (SFC)

This section deals with methods that are applicable to individual video frames or images. In one or more embodiments, two single-frame methods are applied early in the frame processing cycle. In each case, the technique does not involve data compression but is designed to facilitate significantly more quality-preserving compression on the part of other techniques. Other methods enhance data compression directly.

SFC—Saving Edge Data for Restoration to Processed Imagery.

The use of lossy compression techniques required for wavelet-based high definition encoding typically results in the loss of some edge data. In one or more embodiments of the systems and methods for wavelet and channel-based high definition video encoding, edge data is captured and preserved before any substitution operations so that a wavelet-based high definition encoder can implement extensive data substitution without regard to edge data loss.

Two examples are provided, showing how edge-data preservation may be implemented so that strong data compression techniques can be applied without concern for the loss of edge data. The first example is general in nature and applicable to any image processing system. The second example is more specific to wavelet-based encoders.

One or more embodiments of a method for edge data recovery are now described.

Figure 9:
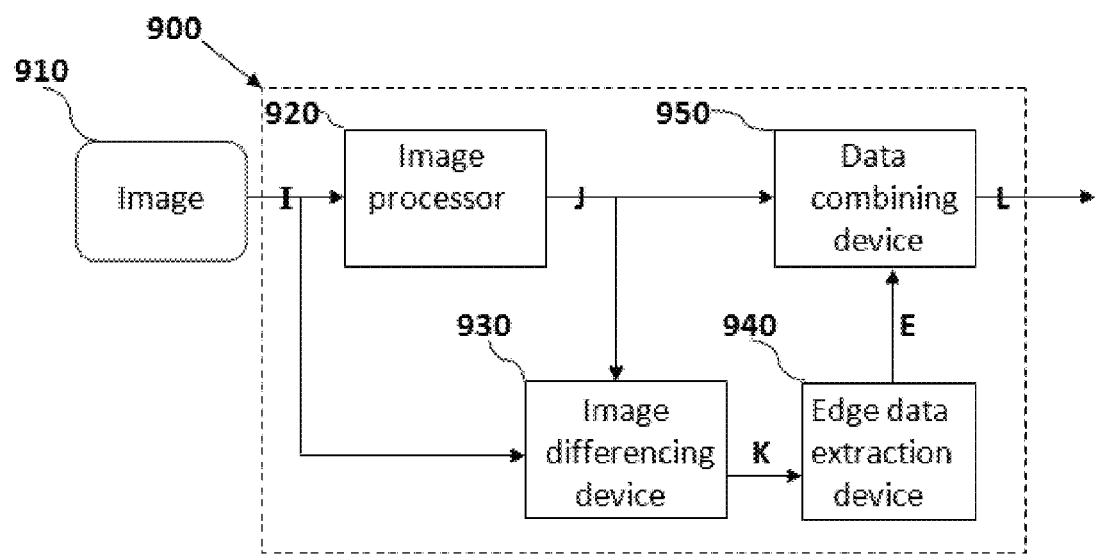
FIG. 9 is an exemplary representation of a system for restoring edge data to a processed image in accordance with one or more embodiments of systems and methods for wavelet and channel-based high definition video encoding.

FIG. 9 is an exemplary representation of a system for restoring edge data to a processed image in accordance with one or more embodiments of systems and methods for wavelet and channel-based high definition video encoding. One of ordinary skill in the art can readily find many variants for accomplishing the same thing, including the embedding of this system or method within other systems or otherwise modifying the specific implementation suggested here without departing from the spirit or the scope of the invention.

The process begins with the image to be processed 910. This image is submitted to an image processing system equipped with edge recovery 900. The image or image data I is processed by an image processing system 920. The resulting image or image data J may have lost some image edge data in the process.

However, this data may be recovered by comparing J with I, possibly using an arithmetic differencing operation between corresponding points in images I and J for example if said images are digital. The image differencing device 930 refers to whatever comparison process is used to obtain difference information K.

Difference image or image data K may include data other than edge data, that is, data there is no wish to retain. The purpose of 940 is to extract edge data E from difference data K. Such data extraction may take many different forms, all of which are intended to fall under the scope of this patent.

Data combine device 950 combining the recovered edge data with that of the processed image or image data J. Whether or not encoded, the output L of the system or method for recovering edge data may be construed as generating a single combined image comprised of J and E, a single combined data stream comprised of J image data and E edge data, or a separate J and E data streams.

Figure 10:
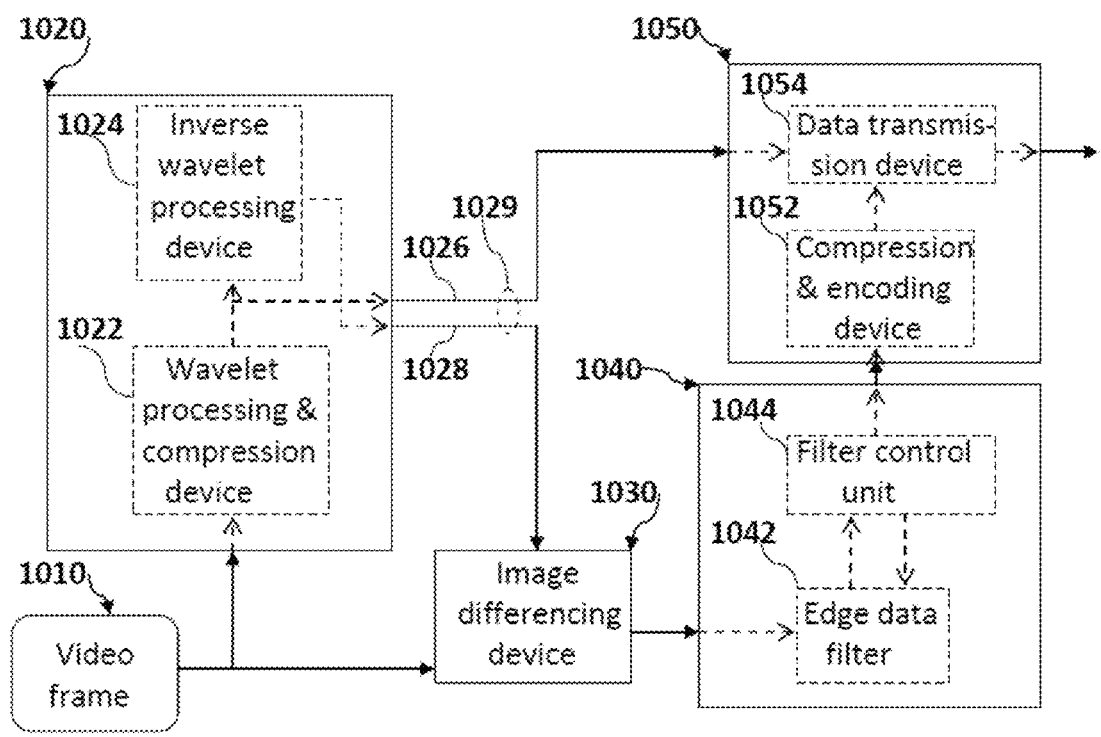
FIG. 10 is an exemplary representation of a system for restoring edge data to video processed by a wavelet-based encoder in accordance with one or more embodiments of systems and methods for wavelet and channel-based high definition video encoding.

FIG. 10 is an exemplary representation of a system for restoring edge data to video processed by a wavelet-based encoder in accordance with one or more embodiments of systems and methods for wavelet and channel-based high definition video encoding. One or more methods for edge data recovery in accordance with one or more embodiments of systems and methods for wavelet and channel-based high definition video encoding involves wavelet-based video processing system, of which wavelet-based encoders would be an example. Edge loss is a common problem with wavelet-based codecs.

In this exemplary drawing, the 'image' is a video frame 1010 and the 'image processor' is a complex image or video processing system 1020, such as a wavelet-based encoder.

Said complex system may include multiple applications of WTs and various lossy compression techniques 1022. In one or more embodiments, the application of these techniques is responsible for the loss of edge data by wavelet-based image processing systems.

Before an image to which a WT has been applied can be displayed, the corresponding IWT must be applied. In a codec this may not occur until a video is ready for display.

In this exemplary method for edge restoration, the necessary IWT capability is incorporated as a component 1024 of the image processor 1020. This construction is apropos if the video encoder of a video codec is construed as an image processor.

Without edge recovery, the data 1026 emerging from 1022 may be the output of the encoder. In this example of edge recovery, however, image differencing is used. Image differencing requires that image comparison occur in image space. Therefore, the output of the wavelet processing and compression device 1022 must first be inversely transformed back into an image. Such IWTs occur in the inverse wavelet processing device 1024. The output 1028 of 1024 is thus the image that might be displayed were there no edge restoration.

The purpose of calling out the loop 1029 that encircles outputs 1026 and 1028 is to point out that said output be jointly construed as the output of the image processor 1020.

This output 1028 is sent to the image differencing device 1030 for comparison to the original video frame 1010. In some preferred embodiments, this comparison consists of a pixel-by-pixel color intensity difference. These differences constitute an image that should include all data lost during the processing that occurred in the image processor 1020, including edge data.

In this example, the edge data extraction device 1040 includes one or more filters 1042 designed to capture edge data from the product of the image differencing device. An example of such a filter would be a very high spatial frequency filter.

The effectiveness of filtering in edge data without including too much noise and texture data depends in part on the difference image being processed. For that reason, in this exemplary embodiment, a filter control unit 1044 is included in the edge data extraction device. Said control unit is designed to test the output of the edge data filter and select, retune, or reapply filters until satisfactory edge data is obtained.

At that point, the filter control unit forwards the edge-image data to the data combining device 1050.

In this embodiment as a video encoder, the edge data image is compressed and encoded by a compression and encoding device 1052.

After compression and encoding, the compressed data may be combined with output of the wavelet processing and compression device in any of several ways, including mathematically (as by a mathematical function of two data streams), merging of two data streams, transmitting two data streams separately, or by some other suitable method. In any case, the data transmission device 1054 combines the data appropriately and makes it available for transmission.

The result of all these processes is that, when the video is displayed, the additional edge data ensures a sharper video viewing experience.

In one or more embodiments of this edge data restoration system, the input image that appears in 1010 is the level for higher level image instead of the video frame (the level 0 image).

One or more embodiments of systems and methods of wavelet and channel-based high definition encoding employ the use of the following technique prior to support space substitutions.

SFC—Use of a Noise Reduction Filter to Improve Support Space Compression.

In one or more embodiments of systems and methods for wavelet and channel-based high definition video encoding, a noise reduction filter is applied to an image just prior to the application of a WT. The purpose of this filter is not to improve the appearance of the image, the usual reason for applying such a filter, but to improve the compressibility of the wavelet space representation of the image. The low frequency noise reduction filter threshold is set high enough to preserve all low frequency and mid-range image data but is set low enough to filter out most noise data. The WT is then applied to the filtered image. All of the noise-supporting data that would have been preserved by the WT is now absent from the support space. The remaining support has more zeroes and near-zero values than the support for the unfiltered image would have. This allows the application of a low threshold filter to replace small support values with zeroes in order to increase the number of zeroes in the support and thus allows greater compression when the RLE is applied. Due to the high redundancy present in the pre-WT image, the early application of a filter of this description is unlikely to have any effect on viewing quality.

Figure 8:
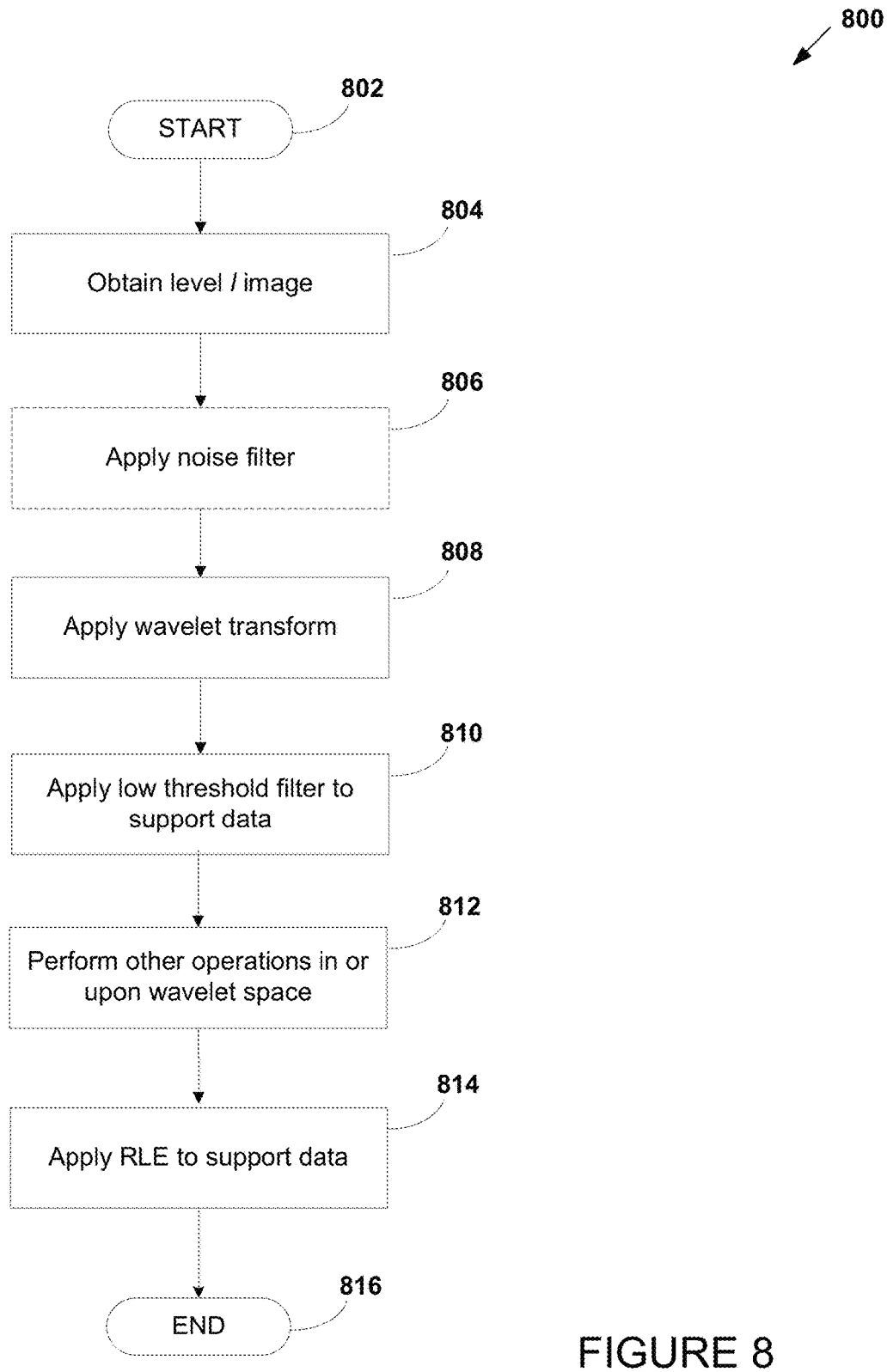
FIG. 8 is a flowchart of one or more embodiments of compressing an image in accordance with one or more embodiments of systems and methods for wavelet and channel-based high definition video encoding.

An example of this procedure is shown in FIG. 8. FIG. 8 is a flowchart of one or more embodiments of modifying an image in accordance with one or more embodiments of systems and methods for wavelet and channel-based high definition video encoding.

Procedure 800 starts at step 802. Processing continues to step 804, where a level l image is obtained. The image could be the original video frame (i.e., a level 0 image) or a level l (l>0) preview construed as a level l image.

Processing continues to optional step 806, where a noise filter is optionally applied.

Processing continues to optional step 808, where a WT is applied. If a noise filter is not applied at optional step 806, all noise in said image is preserved by the WT because the WT is fundamentally lossless. The great majority of noise is high frequency in nature and is therefore preserved by support data. However, if a noise filter is applied at optional step 806, when the WT is applied to the filtered image in step 808, the support data that preserved the noise is absent from the support data after optional step 806.

Processing continues to step 810, where a low threshold filter is applied to support data. If there was much noise in the original image, then the values of the support data that preserves this noise may be sufficiently large in magnitude that no threshold filter can effectively distinguish noise support from important image support data.

This large magnitude noise support data will survive the application of a low threshold filter to the support data that occurs in step 810.

However, the application of the same low threshold filter after optional step 806 will result in a lower noise level in support data. Much of the remaining noise support may be low in magnitude and thus successfully filtered (i.e., zeroed) by the low threshold filter operation in step 810.

Processing continues to step 812, where various other operations may now be applied to the resulting wavelet space, such as further filter operations on the support space or an additional WT applied to the preview.

Processing continues to step 814, where the remaining support data for level (l+1) is losslessly compressed using run length encoding. Usually, the strongest single source of compression is the presence of long runs of zeroes. Therefore, a great deal more compression can be expected from support data with many more zeroes, a typical result of optional step 806.

Processing continues to step 816, where process 800 terminates.

Change in support data has the potential to cause some loss of image quality after decoding. One or more embodiments of the systems and methods for wavelet and channel-based high definition video encoding are configured to modify support data conditionally without noticeably reducing visual quality. This may be achieved with the help of such external inputs as target viewing quality and target compression and such internal measurement inputs as estimated viewing quality and achieved compression.

One or more embodiments of systems and methods of wavelet and channel-based high definition video encoding achieve compression of support data by the replacement of support space data, especially with zeroes.

Conditional and/or selective substitution of zeroes or other constant values in support data may be used in one or more embodiments of systems and methods for wavelet and channel-based high definition video encoding.

One or more embodiments of systems and methods for wavelet and channel-based high definition video encoding are configured to condition zero substitution for support data on the comparison between the value v of data in support space and a threshold value $\theta$. Zero is substituted for v if $|v| \leq \theta$; otherwise, v is unchanged.

In one or more embodiments of the systems and methods for wavelet and channel-based high definition video encoding, said threshold $\theta$ is a function of k, $\Delta Q$, and $\Delta C$, where k is the level number, $\Delta Q$ is the offset ($Q_T - Q_E$) of estimated quality $Q_E$ from target quality $Q_T$, and $\Delta C$ is the offset ($C_T - C_A$) of achieved compression $C_A$ from target compression $C_T$. In that case, $\theta$ is a function $\theta(k, \Delta Q, \Delta C)$ such that $\theta$ decreases monotonically with increasing k and increasing $\Delta Q$ and increases monotonically with increasing $\Delta C$.

The reason for allowing the more relaxed replacement condition on the lower level relates to the information content of data on that level. On any level, preview data typically carries the preponderance of visual information about the original image. With each increase in level, this information is concentrated in one fourth the data, thus amplifying the impact of any change in support space data in the next level up. For this reason, higher-level support data contains correspondingly more level 0 image data and should be discarded more sparingly.

The previous paragraph explained that replacement of level 1 support data has less impact on visual quality than higher-level data replacement. Moreover, uniform replacement ensures the absolute maximum in support data compression for that level.

SFC—Use of a High Threshold Filter to Replace all Level 1 Support Data with Zeroes.

In one or more embodiments of systems and methods of wavelet and channel-based high definition video encoding, the value of said threshold function on level 1 is the maximum possible value of the data channel (typically 255 for a color channel). In this case, the entire level 1 support space is replaced with zeroes. With 75% of wavelet level 1 filled with zeroes, not only is a great deal of compression achieved, but also a large amount of later processing is simplified or avoided.

The reasoning of the previous paragraphs suggests combining two techniques that, together, result in up to 75% compression with good quality retention and with the additional benefit of up to a 75% reduction in overall encoder processing. In one or more embodiments of systems and methods for wavelet and channel-based high definition video encoding, all level 1 support data is automatically replaced with zeroes.

SFC—Unconditional Replacement of all Level 1 Support Data with Zeroes.

In one or more embodiments of systems and methods of wavelet and channel-based high definition video encoding, level 0 processing is completed by computing only the level 1 preview and unconditionally substituting zeroes for all level 1 support data. Because no data tests are required, this unconditional substitution has the added advantage of processing speed.

Multi-Frame Compression (MFC)

This section deals with methods that are applicable to a plurality of video frames or images. A method is exemplified that searches for similarities in successive video images for the purpose of compression. Then methods are exemplified for compressing support space data with the help of image space or support space difference operations.

As used herein, the expression "multi-frame compression" refers to any methodology the application of which requires data derived from a plurality of video frames in order to compress the data in said plurality, but without requiring the use of motion prediction or motion compensation methods to encode or decode video frames.

MFC—Static Subframe Mosaic Algorithm

As used herein, the expression "static subframe mosaic algorithm" refers to an algorithm that compares same-size, same-position subarrays of a pair of images for the purpose of performing non-motion predictive compression on one of the images whenever a sufficiently near match is found. As used herein, the expression "subarray of an image" refers to a rectangular array that is contained within the image array. As used herein, the phrase "same-size, same position subarrays of a pair of images" refers to two subarrays, one in each image, that have the same horizontal and vertical dimensions and are identically positioned in their respective images. As used herein, the expression "non-motion predictive" means that the purpose of the algorithm is not to replace a block of image data in one frame with a motion vector referencing the corresponding block in the other frame. In fact, the static subframe mosaic algorithm replaces the values of data within said corresponding block with the median value of said corresponding block. Constant value blocks in an image leads to runs of constants in image space and narrow ranges of values in regions of next-level support space, therefore increasing compression in both spaces.

As used herein, the term "mosaic" refers to a collection of one or more adjacent or overlapping subarrays with nearly equal median values. Two subarrays or mosaics are generally said to be "adjacent" if they share part of a mutual boundary or one partially overlaps the other.

The static subframe mosaic algorithm may be used in one or more embodiments of systems and methods for wavelet and channel-based high definition video encoding.

In one or more embodiments of the algorithm, compression results from replacing all values in one matching subarray by a single value. For processing speed, the binary image may be constructed from the truth values of a pixel-by-pixel inequality test between the two images or subarrays. If said binary image is available, then 'near identity' between two subarrays can be determined by counting the is in that subarray of said binary image: if this number is smaller than some predetermined value, then the subarrays may be considered 'nearly identical'. Alternatively, the two subarrays may be compared directly and their number of mismatches computed. After all the nearly matching subarrays are determined, the set of nearly identical arrays are partitioned into disjoint regions by the following criterion: if two said arrays are adjacent or overlapping with nearly equal median pixel values, then they are in the same region. Using the current image, a replacement value is computed for each region. The values of all data in a region are replaced by the same value. That value may be computed from a weighted average of the median values of subarrays in the region, for example.

One or more embodiments of the systems and methods for wavelet and channel-based high definition video encoding are configured to apply a static subframe mosaic algorithm, described below. The static subframe mosaic algorithm may be used to determine whether one or more subarrays of a frame are static from one frame to another. Compression is achieved by uniformly replacing all the values within relatively motionless subarrays by a single computed value.

Figure 4:
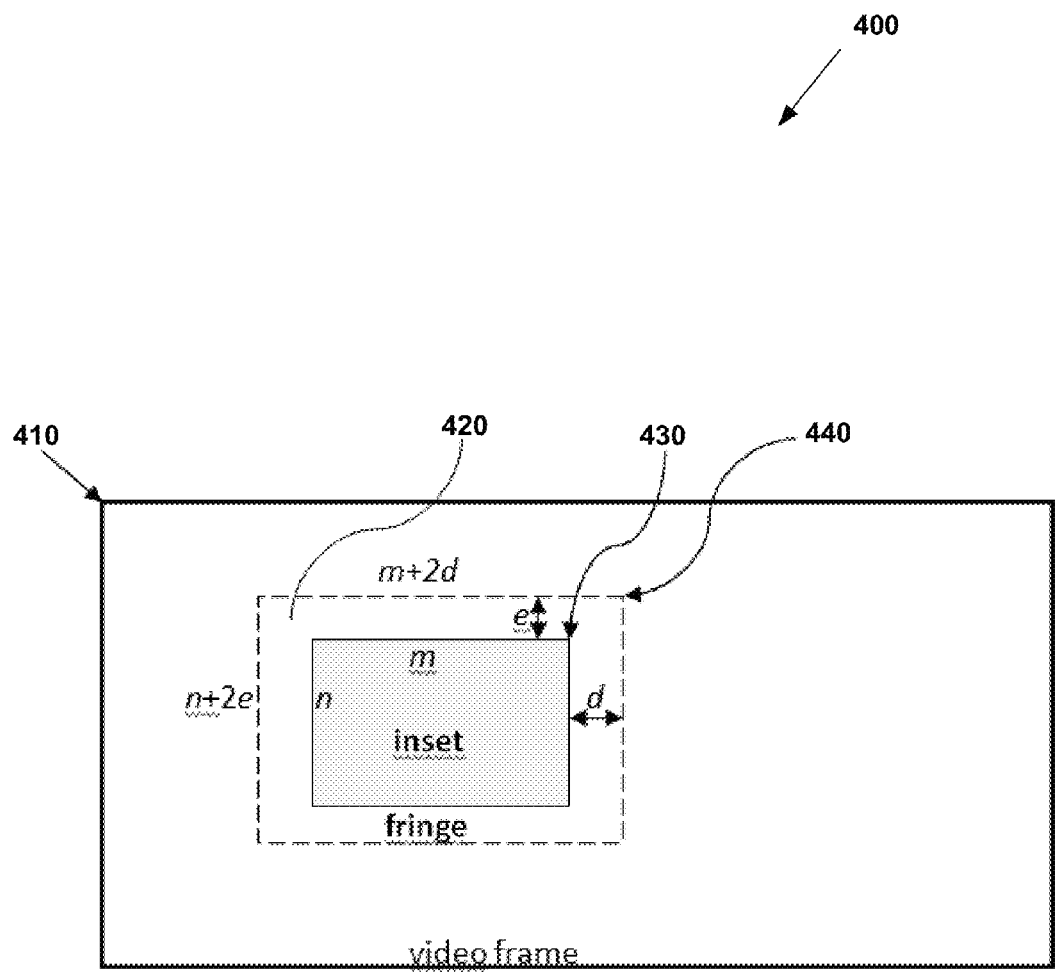
FIG. 4 illustrates the fringe and inset of a subarray processed by the static subframe mosaic algorithm in accordance with one or more embodiments of systems and methods for wavelet and channel-based high definition video encoding.
Figure 13:
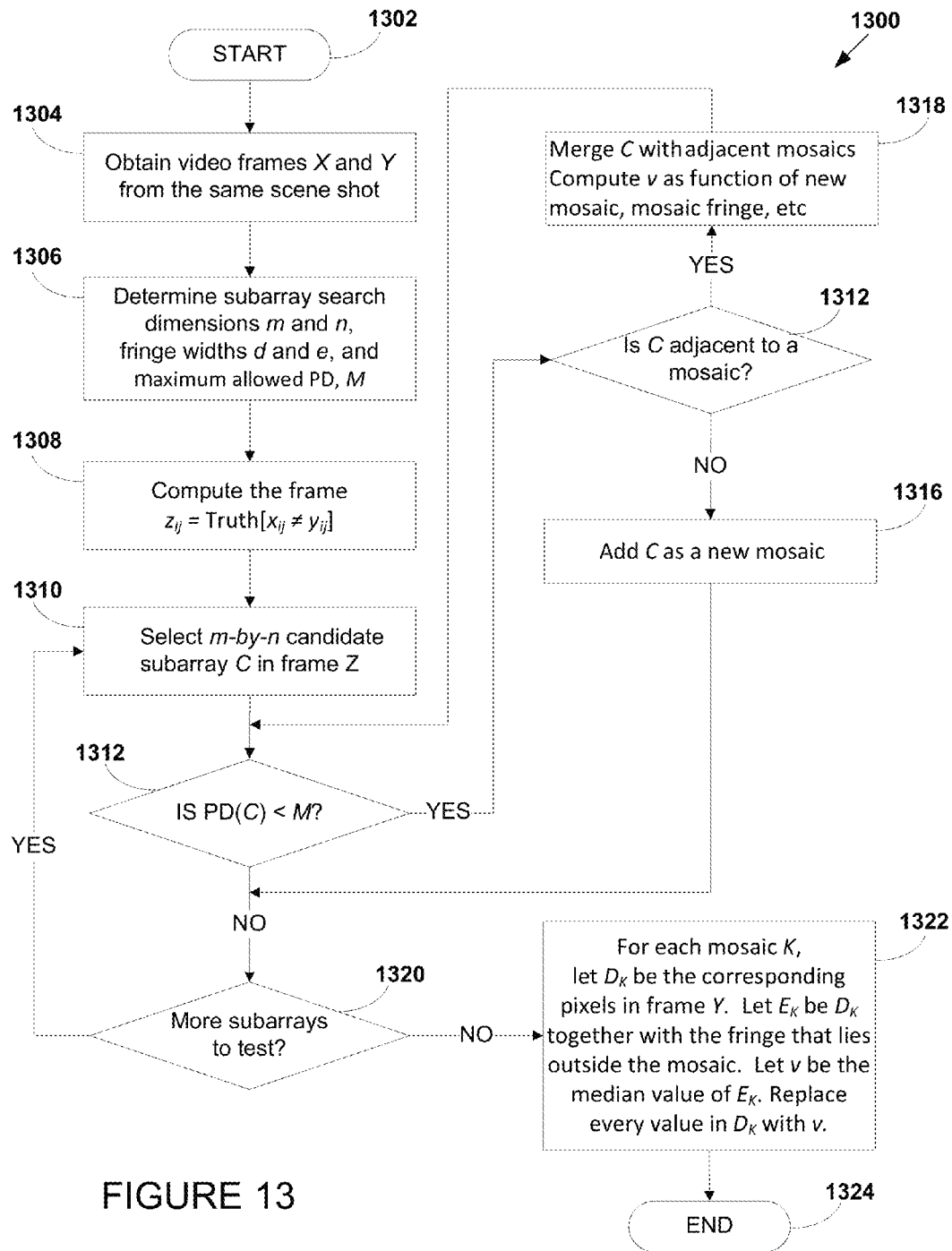
FIG. 13 is a flowchart of one or more methods for carrying out the static subframe mosaic algorithm in accordance with one or more embodiments of systems and methods for wavelet and channel-based high definition video encoding.

An example of this procedure is shown in FIG. 13 and FIG. 4. FIG. 13 is a flowchart of one or more embodiments of the static subframe mosaic algorithm in accordance with one or more embodiments of systems and methods for wavelet and channel-based high definition video encoding. Procedure 1300 starts at step 1302. Processing continues to step 1304, where a pair of video frames X and Y are obtained from the same scene shot. The goal of the algorithm is to increase the effectiveness of RLE compression by replacing the data in appropriate subarrays of frame Y with a single value.

Processing continues to step 1306, where certain parameters needed for the search are obtained from the virtual control system of the wavelet-based encoder. These parameters include the horizontal and vertical dimensions of the subarrays to be tested and their fringes. Said dimensions are shown in FIG. 14. Also obtained in step 1306 is the maximum number M of point differences (PD) that will be used as a condition to identify subarrays suitable for replacement by a constant.

Processing continues to step 1308, where the pixel-by-pixel inequality truth value frame is computed:

$$[z_{i,j}]=[\text{Truth}(y_{i,j} \neq x_{i,j})].$$

Frame Z is a binary array which displays as zeroes all regions on which X and Y are identical. Thus, the number of pixels of a subarray for which X and Y disagree is the total number of ones in the corresponding subarray of Z.

The rest of the algorithm involves a systematic search of the m-by-n subarrays of Z to identify those with little total positive data. Such subarrays correspond to same-positioned subarrays of X and Y that are sufficiently close to identical to trigger the substitution. To this end, a set of candidate subarrays of Z are to be tested. For the purpose of this example, any systematic method for sequencing the candidates is satisfactory. In practice, some methods are much more efficient than others. Suppose, now, that the candidates have been sequenced. Processing continues to step 1310, where the next candidate subarray C is selected.

Processing continues to step 1312, where the sum of all channel data within subarray C of Z is summed to obtain the value PD(C). If PD(C) is less than M, processing continues to step 1314, where subarray C is tested for adjacency or overlapping with existing mosaics.

If C is not adjacent to an existing mosaic, then processing continues to step 1316, where C is added to the collection of mosaics If C is adjacent to an existing mosaic K, then processing continues to step 1318, where K is extended to include C, and this extension replaces mosaic K as a new mosaic.

Either way, processing then returns to step 1310.

If in step 1312, PD(C) is at least M, then processing continues to step 1320, where it is determined whether there remain untested subarrays.

If untested subarrays remain, then processing returns to step 1310, where another candidate subarray is selected for test. If no untested subarrays remain, then processing continues to step 1322, where each existing mosaic K is processed as follows:

Let $D_K$ be the set of pixels located in frame Y at the same positions as those in K relative to frame Z. Each array comprising K corresponds to an array in $D_K$. Thus, each array in $D_K$ has a corresponding fringe as defined in FIG. 4, 420. Some portion of these fringes form a fringe around the entire mosaic $D_K$. Define $E_K$ as the extension of $D_K$ to include this external fringe. Let $v_K$ be the median value of all data in $E_K$. Replace the value of all data in $D_K$ with the value $v_K$. After this process in complete, the processing terminates with step 1324.

An alternative to the embodiment of the static subframe mosaic algorithm shown in the flowchart is to compare same-position subarrays of frame X and Y. Finding the subarrays whose PD is less than a predetermined value M has the same effect as steps 1310 and 1312.

One of ordinary skill in the art would appreciate that any method capable of identifying pairs of sufficiently similar same-size, same-position subarrays may be incorporated into one or more embodiments of system and methods for wavelet and channel-based high definition video encoding without departing from the spirit and the scope of the invention.

FIG. 4 illustrates an extended subarray consisting of a fringe 420 and an inset 440. In one or more embodiments, the fringe is incorporated to suppress noticeable artifacts, including flickering and certain other artifacts. One set of preferred dimensions of the subarray is (m+2d)×(n+2e), where d=m/16 and e=n/16. The inset is an m-by-n pixel array, with horizontal fringes of width d and vertical fringes of width e. After two or more subarrays are merged to become a mosaic, some data that was once part of a subarray fringe becomes part of another subarray of the mosaic. In effect, the mosaic itself has a fringe, consisting of the surviving fringes of its constituent subarrays. As is the case for individual subarrays, the fringe pixel values are part of the calculations determining the uniform replacement value of the mosaic but are not themselves affected by the static subframe mosaic algorithm.

In one or more embodiments of the static subframe mosaic algorithm, only adjacent subarrays that pass the difference test (1312) with sufficiently close median values, are merged into the same mosaic and therefore use the same replacement value. In one or more embodiments, the adjacent subarrays are merged using a weighted mean of their median values as the replacement value.

The static subframe mosaic algorithm may be adapted for use within other video codecs, including DCT-based codecs. One or more embodiments of systems and methods for wavelet and channel-based high definition video encoding are configured to apply the static subframe mosaic algorithm to non-successive images and previews.

Suppose X and Y are two level 1 images. Common pixel-by-pixel difference operations include x−y, |x−y|, and bit-wise EXCLUSIVE OR between the binary representations of x and y. The first of these operations is referred herein as the "arithmetic difference" (X−Y), the second as the "absolute difference" |X−Y|, and the third as the "EXCLUSIVE OR" (X⊕Y) of arrays X and Y. For present purposes, each has limited value. The arithmetic difference can lead to negative values, the absolute difference is lossy and uninvertible, and the EXCLUSIVE OR is non-linear for values greater than two. Each must be therefore used with care and not used inappropriately. It is understood that one familiar with the art will limit and modify techniques and discussions involving differencing operations appropriately.

Wavelet-based encoding provides at least four multi-frame compression opportunities. The first three involve kinds of operation in image space that enhance compression in image space. The fourth involves operations that are applied in support space. Each of these methods is now illustrated.

MFC—Differencing Images.

Recalling that a video frame is a level 0 preview, differencing and other operations among possibly translated or transformed level k images of video frames within the MVF of one another in the same scene shot can significantly reduce the effective range of values in the difference image compared to the original images. This contributes to substantially greater compressibility by RLE and other entropy encoding schemes. When used effectively, this can increase overall video compression factor by 10% or more in one or more embodiments of systems and methods of wavelet and channel-based high definition video encoding.

If EXCLUSIVE OR (XOR) differencing is used between highest-level previews (only), then the foregoing continues to be true. Moreover, EXCLUSIVE OR differencing can be 'chained' in the following way. Let $P_0, \ldots, P_j$ be a sequence of highest-level images. As each preview $P_i$, i>1, becomes available a new image $Q_i$ is are generated:

$$Q_i = P_i \oplus P_{i-1}, i=1, \ldots, j. \quad (12)$$

Each EXCLUSIVE OR difference image $Q_i$ is significantly more compressible that the corresponding P. Therefore $P_0$ and the sequence of XOR difference images $Q_1, \ldots, Q_j$ are encoded for storage or transmission. Because XOR differencing is losslessly invertible, the decoder can recreate $P_i$, i=1, ..., j as $Q_i$ becomes available, using the formula $$P_1 = P_0 \oplus Q_1 = P_0 \oplus (P_0 \beta P_1), \ldots, P_j = P_{j-1} \oplus Q_j = P_{j-1} \oplus (P_{j-1} \oplus P_j) \quad (13)$$

One or more embodiments of the systems and methods for wavelet and channel-based high definition video encoding are configured to implement temporal compression between successive same-level (and therefore, same-size) previews. First assume this is a pair of successive full size video frames X and Y (level 0 images) with no background motion and little other motion. Difference frame Z=Y−X, using the conventional arithmetic pixel-by-pixel difference, $z_{i,j} = y_{i,j} - x_{i,j}$, contains many small or zero values. Data is not discarded from the difference preview but, as noted above, the difference preview may be more compressible than the original previews.

In one or more embodiments, a certain amount of near-zero support data may be replaced with zeroes, after arithmetically differenced previews are appropriately transformed by a WT. The function $T_\theta(W(Z))$ is defined as the difference preview together with the thresholded support array. If the IWT is applied to $T_\theta(W(Z))$ to obtain $Z\hat{} = W^{-1}(T_\theta(W(Z)))$, then this image $Z\hat{}$ may be added to X, yielding $\hat{Y}$, an image space approximation of Y. Alternatively, W(X) is added to $T_\theta(W(Z))$, and then the IWT is applied to obtain $\hat{Y} = w^{-1}(W(X) + T_\theta(W(Z)))$ to approximate Y. This technique is most likely to be effective if there are very large amounts of non-zero support data for the original images X and Y.

The effect of this process is that a full video frame has been replaced by the WT of a difference frame, resulting in a quarter-size preview, together with highly compressed support space. This preview and compressed support is encoded, transmitted, and decoded back to an approximate difference frame. This approximate difference frame is then added to the preceding full sized frame to recreate the approximation of the second video frame.

To one of ordinary skill in the art, it will be clear that the above process could start with any level image and carried out with the next level preview and support space without departing from the spirit or the scope of the invention. It will also be clear that this process can be repeated for more than one frame. Therefore, in one or more embodiments, only every $k^{th}$ full frame need be encoded and sent. Intervening frames would be replaced with their difference frames and compressed.

Figure 11A:
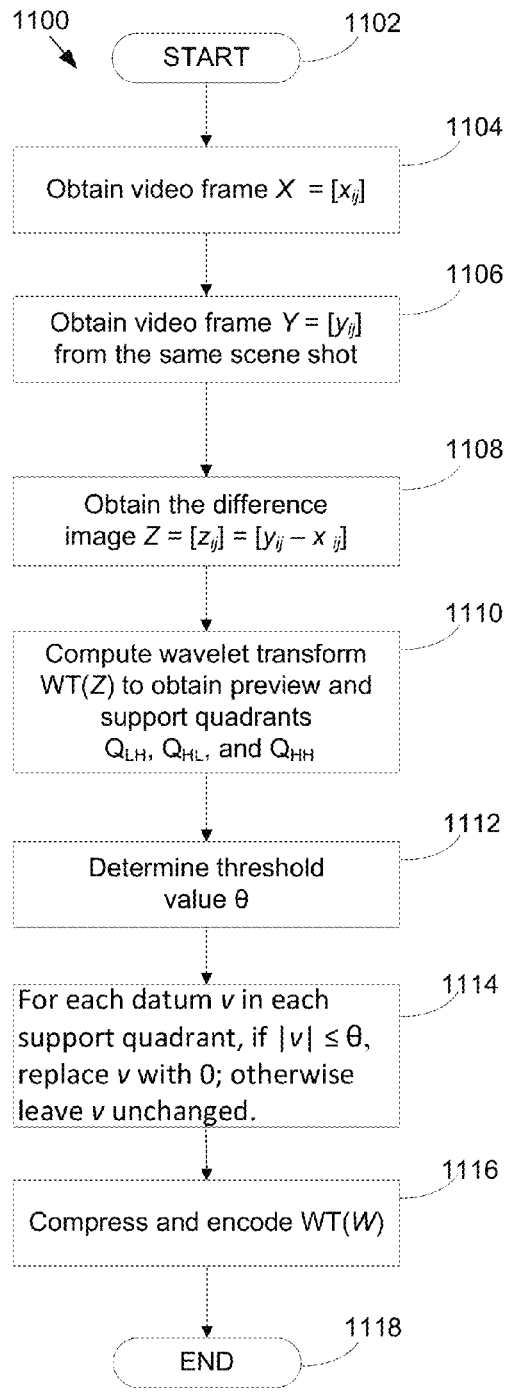
FIG. 11A-B are flowcharts of an exemplary method for compressing a video frame (FIG. 11A) and decoding the compressed video frame (FIG. 11B) in a wavelet-based codec in accordance with one or more embodiments of systems and methods for wavelet and channel-based high definition video encoding.
Figure 11B:
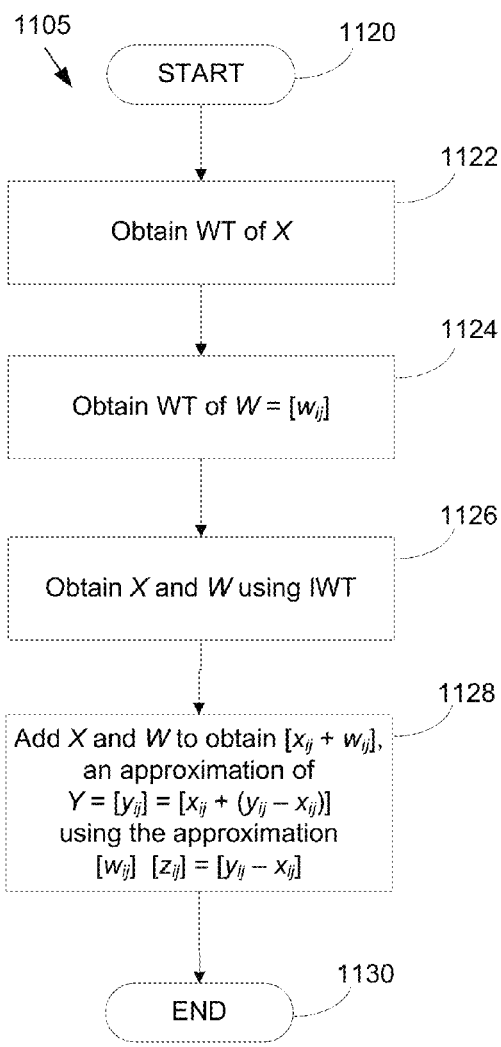

FIG. 11A-B are flowcharts of an exemplary method for compressing a video frame (FIG. 11A) and decoding the compressed video frame (FIG. 11B) in a wavelet-based codec in accordance with one or more embodiments of systems and methods for wavelet and channel-based high definition video encoding. In FIG. 11A, encoding process 1100 starts with step 1102.

Processing continues to step 1104, where a video frame X is obtained.

Processing continues to step 1106, where a nearby video frame Y is obtained.

Processing continues to step 1108, where the difference frame Z is constructed by subtracting the data channel values of X from those of Y.

Processing continues to step 1110, where the WT is applied to Z to obtain preview P and support quadrants $Q_{LH}$, $Q_{HL}$, and $Q_{HH}$.

Processing continues to step 1112, where a threshold value θ is generated by the virtual control system.

Processing continues to step 1114, where the threshold is applied to each support datum, replacing with zero all data whose absolute value is not greater than θ. Let W be the image whose wavelet transform is the preview of WT(Z) together with the thresholded support, $T_\theta(Q_{LH})$, $T_\theta(Q_{HL})$, and $T_\theta(Q_{HH})$.

$T_\theta(Q_{LH})$, $T_\theta(Q_{HL})$, and $T_\theta(Q_{HH})$ are expected to contain many more zeroes and thus be much more compressible than the original support quadrants $Q_{LH}$, $Q_{HL}$, and $Q_{HH}$ of Z, and still more than those of WT(Y).

The wavelet space arrays comprised of the preview P of Z, together with support quadrants $T_\theta(Q_{LH})$, $T_\theta(Q_{HL})$, and $T_\theta(Q_{HH})$, represent the WT of a new image, defined as W. W is expected to closely resemble the original difference image Z.

Processing continues to step 1116, where WT(W) is compressed and encoded.

Processing continues to step 1118, where process 1100 terminates.

In FIG. 11B, decoding process 1105 starts with step 1120.

Processing continues to step 1122, where the encoded video frame WT(X) is obtained.

Processing continues to step 1124, where WT(W) is obtained.

Processing continues to step 1126, where the IWT is applied to WT(X) and WT(W) to obtain X and W.

Processing continues to step 1128, where an approximation of Y is obtained by adding X and W. Recalling that W is an approximation of the difference frame Z=Y−X, W is added to X to obtain an approximation of the image Y.

Processing continues to step 1130, where decoding process 1105 terminates.

One of ordinary skill in the art would recognize that variations on differencing as described in FIG. 11 may be used in one or more embodiments of systems and methods of wavelet and channel-based high definition video encoding without departing from the spirit or scope of the invention, including but not limited to the embodiments described below.

In one or more embodiments, instead of computing the difference frame Z=Y−X and then applying the WT to Z, the WT is applied to Y, and then the arithmetic difference WT(Y)−WT(X) is computed. The threshold filter operation is applied to the support quadrant differences.

Another variation that would be obvious to one skilled in the art is to carry out processes similar to the above involving multiple applications of the WT.

Still greater compression could be achieved by combining the above techniques with the use of appropriate motion vectors. The desired effect is to reduce the content of the difference frame or its WT and thus further enhance compressibility. This involves a tradeoff between encoding processing time, and compression gains that depends heavily on the wavelet level on which the motion analysis is occurring (the higher the level, the much smaller the amount of computation required), the amount of motion, the source of motion, the degree of detail in the image, and other factors affect the difference array.

The resulting compression with the use of differenced transforms that occurs in wavelet-based high definition video encoding stands in contrast with the motion compensation methods used in most other codecs. For example, no piecewise deconstruction, reconstruction, and repair is added to the processing load of the decoder.

The horizontal and vertical dimensions of previews are halved at each level. The number of pixels in the level (i+j) preview is $(1/4)^i$ that of the level i preview. Any operation whose computational performance, run time, or complexity is proportional to the number of pixels in an image can be expected to run more quickly on the next higher-level preview by a factor of four.

MFC—Use of Systems and Methods of Wavelet and Channel-Based High Definition Video Encoding to Improve Performance and Effectiveness of Other Video Codecs.

Full frame WTs may be used within other video codecs, including DCT-based codecs, in order to gain the advantage of the higher-speed processing that lower resolution images allow. For example, after applying a WT to a pair of successive video frames, motion prediction vectors may be computed for one of the previews relative to the other. Either these vectors may be used to recreate one preview from blocks of the other, or said vectors may be doubled and redoubled in length and used to restore one frame from blocks of the other. This method allows conventional motion prediction methods to be used more efficiently within wavelet-based codecs and shows how non-wavelet based codecs may be able to use wavelets to improve the efficiency of motion prediction methods.

Channel Exchange and Flexible Display

This section illustrates several features and capabilities of systems and methods of wavelet and channel-based high definition encoding that permit the decoder unprecedented flexibility in the way it can display video. This section takes advantage of two features inherent to wavelet-based encoding: channel neutrality and implicit scalability.

In one or more embodiments of systems and methods of wavelet and channel-based high definition video encoding, a digitized video frame includes K data channels, K>0, each channel a positional function $f_k(i,j)$, a numerical representation of the same image, with a lower and upper bound $L_k$ and $U_k$, k=1, ..., K. The value of each pixel (i,j) in the m-by-n array is a K-dimensional vector $<f_1(i,j), \ldots, f_K(i,j)>$.

However the actual processing is carried out, in one or more embodiments the wavelet transform may be construed as applied channel-by-channel, resulting in a total of K distinct next-level previews and K distinct next-level support spaces.

Alternatively, these wavelet space data may be represented as K-dimensional vectors, each dimension the wavelet transform of the corresponding previous level image. Thus, the wavelet coefficients for each channel retain their spatial correspondence to one another. Nonetheless, each channel may be processed independently.

Uninterpreted wavelet channels may be used in one or more embodiments of systems and methods for wavelet and channel-based high definition video encoding.

Channel data include arrays of numbers. These numbers are 'dimensionless' in the sense that they carry no intrinsic interpretation. Interpretation as to the meaning of channel data as 'a gray scale array' or 'the intensity of the color red in an RGB color space' is extrinsic to WT and IWT processes. For this reason, swapping channel data, for example, re-interpreting the red data channel as green and the green data channel as red can be achieved in at least two ways. Suppose for each pixel (i,j), the RGB representation is carried by three component data channels $<f_1, f_2, f_3>$ with $f_1$ carrying the red intensity values, $f_2$ carrying the green intensity values, and $f_3$ carrying the blue intensity values. A computer instruction could exchange $f_1$ and $f_2$ for each pixel so that the pixel vector is now $<f_2,f_1,f_3>$. Or no change in data or data structure need occur at all. Instead, the encoder instructs the decoder to display $f_1$ as the green coordinate and $f_2$ as the red coordinate of the RGB display.

As defined herein, the expression "channel-based video encoding" means removing the data channel from its interpretation so that channel data are inherently dimensionless and all processing is independent of channel data interpretation unless otherwise specified by encoder processes (as, for example, when the decoder assigns individual channels to the red, green, and blue inputs of the output display).

Certain examples in this section illustrate the convenient consequences of channel-based video encoding. Additional examples illustrate opportunities for compression that arise from cross-channel condition testing.

Channel-based video encoding contributes to flexible display by the decoder. Another feature contributing to flexible display provided by one or more embodiments of systems and methods of wavelet and channel-based high definition video encoding is scalable multiresolution encoding, described later in this section. Still other methods are employed in one or more embodiments of systems and methods of wavelet and channel-based high definition video encoding that enable the decoder to display extra-high definition video in HD displays and convert HD video to extra-high definition video for theater display.

In order to achieve the amount of compression necessary for HD streaming, most existing encoders, including H.264 standard HD encoders first convert RGB inputs to color representations like YCbCr 422 (almost lossless but seldom used) or YCbCr 420 (most common). These conversions boost compression by decorrelating the RGB color channels. Once the conversion occurs, all encoding and decoding operations work with YCbCr color coordinates. However, the YCbCr 420 conversion is lossy and sacrifices some color quality in the final decoded and displayed RGB video.

Systems and methods for wavelet and channel-based high definition video encoding easily achieve HD-adequate compression without resorting to color decorrelation. For this reason, systems and methods for wavelet and channel-based high definition video encoding can operate without changing input color space and can transform from one color space to any other on demand, at anytime during the encoding process.

Channel-Neutral Color Space Encoding

One or more embodiments of the systems and methods for wavelet and channel-based high definition video encoding are configured to operate effectively with any video color space or sequence of color spaces. Although specific color spaces may be advantageously used, systems and methods for wavelet and channel-based high definition video encoding can carry out nearly all functions without reference to a particular color space, color channel, or intended interpretation of color data.

Systems and methods for wavelet and channel-based high definition video encoding can be configured to process video frames defined in terms of any color space, including three basis-color spaces. The encoded video may be in a display-ready color space, like RGB. However, in principle, the choice of color transformation for RGB display can be postponed to the last step in the decoder.

As used herein, the expression "channel support compositing" (CSC) refers to any methodology for modifying the value of data in the support of one channel on the basis of same-position data in the support of another data channel on the same level. As used herein, the expression "channel support composite" refers to any image or video frame created by means of channel support compositing. As used herein, the expression "color space support composite" refers to a channel support composite for which the modified data channel and at least one of the other support channels used in channel support compositing are color channels.

Prior art avoids frequent color space modification in video because it introduces a visible flickering effect. A major advantage of channel support modification is that it can achieve considerable compression without being noticeable to the eye.

One or more embodiments of the systems and methods for wavelet and channel-based high definition video encoding are configured to implement color channel support modification and/or compositing.

For example, in one or more embodiments, the system operator specifies a primary color space and a secondary set of data channels, possibly comprising a color space. Suppose the level k support for a color channel of the primary color space and for a selected channel of the secondary data channels is available. Suppose also a value θ, at least zero, is provided by a virtual control system. One or more embodiments of the systems and methods for wavelet and channel-based high definition video encoding are configured to apply the following methodology to the support of the primary image. For each position (i,j), value $x_{i,j}$ in the level k support of a primary color channel and each same-position $y_{i,j}$ in the level k support of a secondary color channel, Replace the value of $x_{i,j}$ with 0 if $|y_{i,j}| \le \theta$ Do not change the value of $x_{i,j}$ if $|y_{i,j}| > \theta$. (14)

This procedure increases the number of zeroes in the support of the primary image and improves compression.

The reason this technique preserves visual quality resides in the mathematics of wavelet support and is related to the fact that every data channel depicts the same image. Substantial compression may be achieved with little or no loss of visual quality.

For one or more embodiments of wavelet and channel-based high definition video encoding, this technique has been tested extensively and has performed excellently using color spaces RGB, YCbCr, YUV, LUV, YCC, YCpCq-Exact and YCpCq-Inexact as primary and secondary spaces, with no visible flicker or other degradation.

One of ordinary skill in the art would appreciate that, although one implementation of channel support modification is described, any method for implementing channel support modification in one or more embodiments of systems and methods for wavelet and channel-based high definition video encoding may be used without departing from the spirit and the scope of the invention.

The color channel support modification process is applicable to other video codecs, including DCT-based codecs.

As used herein, the expression "hyper-dimensional color space" refers to a color space with more than three basis colors or any representation of colors that uses more than three data channels. Hyper-dimensional commercial systems are already emerging. Some systems include an 'Alpha channel', designed to selectively brighten the video pixels. With its Quattronml system, Sharp has added a yellow channel to their RGB system.

One or more embodiments of systems and methods for wavelet and channel-based high definition video encoding are configured to implement hyper-dimensional color encoding and support hyper-dimensional decoding.

One or more embodiments of the systems and methods for wavelet and channel-based high definition video encoding are adapted to implement encoding of video frames in four or more color channels. In one or more embodiments, systems and methods are configured for hyper-dimensional processing. Alternatively, for example, systems and methods for wavelet and channel-based high definition video encoding may perform the conversion of the hyper-dimensional color space to RGB coefficients or any other three-channel color representation prior to decoding.

One or more embodiments of systems and methods for wavelet and channel-based high definition video encoding are configured to implement real time and frame-to-frame control of the color selection process. The systems and methods may be adapted for scientific and military applications, including false color display of satellite imagery, realistic night-vision display, multicolor x-ray display, and any other application compatible with channel neutrality in video encoding. For example, an exemplary implementation for encoding Landsat satellite system hyperdimensional data is described in Example 1.

Dyadic Color Spaces for High Performance Transformation.

A dyadic fraction is a fraction of the form $\pm 2^{-k}$ for some non-negative integer k. Therefore, a sum of dyadic fractions is any summation of the form $\Sigma_0^n b_k 2^{-k}$ where n is a non-negative integer and each $b_k$ is −1, 0, or +1. As used herein, the expression "dyadic color space" refers to color space whose coefficients of transformation to RGB are all sums of dyadic fractions. Thus, if [x,y,z] are the RGB coordinates of a color, and [x',y',z'] are the coordinates of that color in color space ABC, and M is a 3×3 matrix $[m_{i,j}]$ such that $$\begin{bmatrix} x \\ y \\ z \end{bmatrix} = M \begin{bmatrix} x' \\ y' \\ z' \end{bmatrix} \quad (15)$$

and each coefficient of the matrix M is a sum of dyadic fractions, then ABC is a dyadic color space.

The systems and methods for wavelet and channel-based high definition video encoding readily moves from one color space to another in the course of encoding video data. For the benefit of the decoder, it is desirable for the encoder to provide the decoder with color data in a color space that can be converted to RGB display with a minimum of computer processing. Short of providing the RGB color coordinates directly, a dyadic color space can be ideal for this purpose.

Each point of a color transformation may require 9 multiplies and 6 additions, multiplication being the predominantly slower operation. A dyadic color space ABC has the property that a computer implementation of the transformation of a point from ABC to RGB can be carried out exclusively by shift register shifts and additions. Therefore, if each coefficient of M involves a sufficiently small number of shifts and adds—that is, if the dyadic sums are very short, the transformation from of three color channels to RGB may be much faster for a decoder provided with ABC color coordinates than with most other color spaces. Other simplifications in the processing are often available that further speed up a transformation from a dyadic color space.

Scalable multiresolution video coding implemented in one or more embodiments of systems and methods for wavelet and channel-based high definition video encoding differs in principle from other known scalable video coding systems, such as H.264. For example, H.264 has three or four alternative 'scalable profiles' that provide a very limited form of scalable video coding. At the foundation of the H.264 method is a minimal-bandwidth, reliable but low quality 'base layer'. Scalable profiles with higher layers provide additional data that can be drawn on in order to reconstruct higher quality video—if the bandwidth supports it and error does not accumulate in the video. These profiles are inflexible, primitive, and seldom used. Yet, there is a widespread need for true multiresolution scalability in video encoding.

Multiresolution Flexibility.

One or more embodiments of systems and methods for wavelet and channel-based high definition video encoding are configured to generate from the same encoded video, decoded video of any resolution, from that of extremely small display sizes to the full resolution of the original, and of virtually any display dimensions and aspect ratios, either on an individual system or simultaneously across a content delivery network.

One or more embodiments of systems and methods for wavelet and channel-based high definition video encoding are inherently scalable in that the encoded video data stream necessarily has all the data needed to provide video of any resolution, up to that of the original image. No special error data or error prediction data are required to generate high quality video.

From a single stream of encoded data, an individual user can be served video to the highest resolution the network and his or her viewing device can support. That same stream can serve multiple devices of a user, each with its own resolution requirements. Similarly, in one or more embodiments, an entire content delivery network can be served by the same encoded video bit stream.

One or more embodiments of systems and methods for wavelet and channel-based high definition video encoding provide a natural 'full-strength' multi-resolution feature. For example, assume that the desired display dimensions are $m_s$ pixels by $n_s$ pixels. Let $P_i$ be the level i preview, the highest-level preview such that resolution $r_i$ of $P_i$ satisfies $r_i \geq \min \{r_s, 2^{-H} r_0\}$, where H is the level number of the highest-level preview constructed. Ordinarily, every preview from $P_H$ to $P_0$ is reconstructed in the course of reconstructing the original image (the level 0 image). Thus, $P_i$ is always available to the decoder.

One or more embodiments of systems and methods for wavelet and channel-based high definition video encoding provide screen size scalability by starting with $P_H$ and iterating the IWT until generating the highest-level preview that the desired display dimensions 'fit into'. Then Intel's Integrated Performance Primitives (IPP) resizing function or any equivalent software or hardware function is used to interpolate that preview according to the desired display dimensions. Let i be the level of the smallest preview such that $m_s < m_i$ and $n_s < n_i$. If i=0, then use the IPP or an equivalent function expand $P_1$ to fit the more restrictive display dimension. Otherwise, i>0. In that case, use the IPP or an equivalent function to shrink $P_i$ to fit the more restrictive display dimension. This ensures that either the vertical or the horizontal dimension of the resulting image meets the specified screen size requirement and the entire image falls within the available display.

One or more embodiments of systems and methods for wavelet-based high definition video encoding are configured to provide a video stream of a specified resolution or a specified screen size on demand from the same decoder stream.

One or more embodiments of systems and methods for wavelet and channel-based high definition video encoding are configured to optimize for video delivery at one or more prespecified resolutions or display dimensions when said prespecified resolutions or display dimensions are known. One or more embodiments may be configured to provide encoded video data that enables the decoder to optimally satisfy the user's prespecified resolution requirements and display dimensions.

In one or more embodiments of a decoder in accordance with systems and methods for wavelet and channel-based high definition video encoding, based on a sufficiently low prespecified resolution requirement $r_s$, no lower-level previews are computed by the decoder. In one or more embodiments of systems and methods for high definition wavelet and channel-based high definition video encoding, based on a sufficiently low prespecified resolution requirement, no lower-level support need be transmitted. Because the lower preview and support levels involve more data than higher levels, these optimizations may potentially reduce the bulk of the transmission and processing, conserving resources such as transmission bandwidth, computer processing, user computer resources, and other resources.

In one or more embodiments of an encoder in accordance with systems and methods for wavelet and channel-based high definition video encoding, even when lower-level support is truncated, higher-level support may still be processed and transmitted, providing a limited range of the scalability.

As used herein, the expression "extra-high definition" refers to an image or video represented with more than the 1080 pixel rows. An increasing variety of extra-HD digital video recorders are available today, able to capture video in such extra-HD formats as 2K (2,048×1,536), 2160p (3,840×2,160), 4K (4,096×3,072), 2540p, and even higher. However, except possibly for specially outfitted theaters, such video cannot be played back on available external players, even HD-capable players. This problem is addressed and resolved by the systems and methods for wavelet and channel-based high definition video encoding.

One or more embodiments of systems and methods for wavelet and channel-based high definition video encoding are configured to modifying high-resolution video for lower-resolution display. For example, extra-HD formatted video may be modified for lower-resolution display. One or more embodiments of the wavelet and channel-based high definition video encoding are configured to process and encode said video exactly as it processes HD-formatted video except that an extra iteration of the WT may be applied. Multiresolution is used to produce encoded video which, when decoded and rescaled, displays HD-formatted video.

In one or more embodiments, the displayed HD-formatted video is the level 1 image of the extra-HD video, rescaled by applying the IPP or equivalent function if necessary to suit the HD display. An additional advantage of this methodology is that the storage, bandwidth, and decoder processing requirements are equivalent to those of storing, transmitting, and decoding ordinary HD video.

In one or more embodiments of systems and methods of wavelet and channel-based high definition video encoding, HD video can be encoded for extra-HD playback. This would give theaters access to the full range of HD video content for large-screen, extra-high resolution display.

In one or more embodiments of systems and methods of wavelet and channel-based high definition video encoding, extra-HD video is generated from standard HD video by including a support space generating function. Given an HD format video, each HD video frame is treated as a level 0 preview (rather than a level 0 image). This preview, combined with an appropriate level 0 support space, constitutes a complete level 0 wavelet space. An IWT applied to this space creates a level (−1) image with twice the resolution of the original HD image.

The systems and methods for wavelet and channel-based high definition encoding are designed to encode HD video for transmission. If, for each video frame, a function is defined that generates a level 0 support space, then said function could be encoded along with the encoded HD video frame for decoding at the video playback site. Once both the HD level 0 preview and its support space was computed, the IWT could be applied to generate a double resolution 2160p level (−1) image.

In one or more embodiments of systems and methods for a high-definition wavelet and channel-based high definition video encoder, the resolution of HD video is enhanced for playback on theater-size screens. In one or more of these embodiments, the HD (1920×1080) image is combined with LH, HL, and HH arrays of zero-value data. From these, the IWT generates a 3840×2160 image. If needed, a second application of the IWT results in a 7680×4320 image. The video may be rescaled to the display screen by applying the IPP or equivalent function.

In one or more embodiments of a systems and methods for a wavelet and channel-based high definition video encoder, extra-HD video is created from standard HD video with a trivial support space generating function. The decoder is enhanced with the capability of processing a plurality of decoded HD video frames as level 0 previews by receiving from the encoder either appropriate non-zero level 0 support data or a support data generating functions to produce them, then applying an IWT to level 0 preview and generated support data to obtain a level (−1) video frame at twice the resolution of the HD video frame. This process may be repeated as needed and/or rescaled for display using the IPP or equivalent function. These embodiments may result in improved viewing quality. These embodiments also have the advantage that they may require the same transmission bandwidth and storage requirement as ordinary HD video and therefore make extra-HD versions of all HD movies available to all extra-HD equipped movie theaters.

In one or more embodiments of a systems and methods for a wavelet and channel-based high definition video encoder, extra-HD video is created from standard HD-video by encoding compressed level 0 support data. In one or more embodiments of systems and methods for a wavelet and channel-based high definition video encoder, the encoder is enhanced with the capability of processing a plurality of HD video frames as level 0 previews by adding appropriate non-zero level 0 support data. Said process may increase bandwidth and storage requirements for the encoded video beyond those of HD video but may reduce decoder processing time compared to the previously described embodiments and thus help make extra-HD versions of all HD movies playable at all extra-HD equipped movie theaters.

DESCRIPTIONS OF SOME IMPLEMENTED EMBODIMENTS

Many typical components found in one or more embodiments of systems and methods of wavelet and channel-based high definition video encoding have been described. The following Examples include nonlimiting implementations of one or more embodiments described herein.

Example 1

Landsat Satellite System Hyper-Dimensional Data

A scientist wishes to examine the effect of seasonal changes in temperature on flora at various altitudes over the course of one or more years. He has a topographic map that provides accurate surface altitudes for the region of interest. Over the period in question, he is able to collect Landsat satellite imagery on a daily basis, from which he is able to extract an infrared image of the region. Finally, he has detailed temperature readings across the region. He collects a year of data into 365 same-time-of-day, properly oriented images. He then encodes and processes them for video display. Either the encoder or the decoder prepares the video for playback on his RGB display. The scientist assigns green to the infrared component, red to the temperature component, and blue to the numerical complement of altitude. He can now watch his video, as it displays the effect of season and temperature on floral life at various altitudes. The fixed topography (shades of blue) provides a stable platform for observing how floral life (shades of green) waxes and wanes with the changing temperatures (shades of red).

Again, the Landsat satellite system provides seven color channels: RGB and four spectral sensor data channels outside of the visible spectrum. The scientist uses the intensities of red to represent temperatures, intensities of green to represent infrared emission, and intensities of brown to represent topography. For RGB representation, this requires that the value assigned to a blue pixel instead be converted to the mixture of red, green, and blue that would produce that intensity of brown. The displayed level of red would then be the sum of the intensity of red required to represent temperature plus the intensity of red needed for brown. Similarly, the intensity of green would be the sum of the intensity required for infrared representation and the intensity required for the topographical representation. Of course, the need for blue would be determined by topography alone. This color transformation occurs either in the encoder or the decoder. The resulting display would now show temperature (in red) and life (in green) against various shades of brown as the background representing topography.

This example illustrates flexibility in choosing how to combine available color hyperspace data. In this example, the input data includes nine color channels: seven Landsat channels, plus the topographical and temperature channels. Six of the Landsat channels were omitted, while the remaining three were nontrivially combined to generate the final RGB display.

Satellite communications are extremely bandwidth-limited. For this reason, the idea of sending seven-color channels in full quality is impractical. Instead of sacrificing quality to transmit all seven color channels, it can make more sense to send only three pre-selected color channels after high compression encoding. This still allows for 35 different sets of basis colors, each of which can be displayed six different ways, depending on the final RGB identification. In the second case, the scientist can count on very high quality infrared data, since no bandwidth was needed for other satellite data.

Example 2

Description of an Implementation of a Limited Embodiment of Systems and Methods of Wavelet and Channel-Based High Definition Video Encoding This description mostly follows the sequencing of the FIG. 5 flowchart. In this embodiment, there are three channels (K=3 in step 508), each of them an RGB color channel. A test of the value of the internal parameter representing the PSCR between the current frame and its predecessor reveals that the two 1920×1080 standard high definition video frames are within the same scene shot.

As in 512 and 516, the next video frame is imported. Channel number k is set to 1 (red), and level number l is set to 0, indicating the video frame is a level 0 image.

The first operations in step 524 are to isolate and save channel 1 edge data, as described in FIG. 10. In this embodiment, additional edge isolation and compression operations are used that are not described in FIG. 10. Having saved the necessary edge data, there is no further concern about edge data loss in the course of processing the video frame.

The low pass filter step is not applied to the level 0 image in this embodiment, and level 0 multi-channel and multi-frame processing does not occur in this embodiment, so steps 528 and 532 are without effect.

Processing continues with step 536, where internal parameters are updated as needed. These may include the PSCR, the ACC, and any others that address such video frame characteristics as may be later required.

Next, the decision to apply the wavelet transform is made in step 540, and processing continues with step 548, where in this embodiment the D4 wavelet transform is applied to the level 0 image.

Processing continues with step 520, where the level 1 preview is treated as a 960×540 level 1, channel 1 image. In this processing iteration of this embodiment, as described in SFC—Unconditional replacement, the entire level 1 support is, in effect, replaced with zeroes. This single operation reduces the amount of uncompressed data to 25% of the original image, as further discussed below.

Processing continues with step 524, where the level 1 image is subjected to a low pass filter for noise reduction. The purpose of this filter is not to 'clean up' the image. In fact this process is skipped if such noise is present by artistic intent. The purpose of this filter is simply to enhance the effectiveness of later compression techniques, as described in FIG. 8 and demonstrated below.

Because the support space is already zeroed, there is no need to apply the quality-compression level-sensitive threshold filter to support data, so the processing continues by step 528, and moves to step 532, which involves multi-frame processing. Processing now continues with step 536, where certain internal parameters are evaluated for future use.

Processing continues to step 540, the WT iteration decision, and then to step 548, where the wavelet transform is applied to the level 1 channel 1 image, to obtain a 480×270 level 2, channel 1 preview and three 480×270 quadrants of support data.

Processing continues to steps 520 and 524. In this embodiment, there is no longer any need for a low pass filter operation. The major operation is the application of the quality-compression level-sensitive threshold θ to the support space. Each support value v is replaced by zero if |v|<θ. The value of θ is determined by the fact that this is level 2 support, by various internal parameters representing compression measurements and quality estimates maintained for this video, and by such external settings as target compression, allotted bandwidth, etc. The value of θ is thus tailored to eliminate a great deal of low-impact support data, while preserving the data that contributes most to quality retention. Support data is typically rife with such easily eliminated data, as visually demonstrated below. The earlier use of the low pass filter may eliminate a great deal of noise that would otherwise have been preserved in the support data as indistinguishable from high-value ineliminable data, as demonstrated below in TABLE 2, Columns 4 and 5, and in FIGS. 12B and 12D, by direct examination.

Processing continues to step 528, where for this video and this embodiment, a secondary color channel, the Y-channel of color space YCpCq happens to be used. This color space was selected in this embodiment because said color space is dyadic and therefore efficient to process. This secondary level 2 channel 1 image is tested. In this embodiment, another threshold, θ', is derived from internal parameters. For each (i,j)-position in the support space of this secondary channel, if the value |v'(i,j)| at this position is less than θ', then the value v(i,j) in the support of the current ('primary') color channel is replaced with zero.

In this embodiment, the EXCLUSIVE OR difference array Q is created from the current level 1 image P and previous level 1 image $P_0$. This serves two purposes: (1) to start or continue a chain of difference arrays, as described in MFC—Differencing images, and (2) to achieve very efficiently the kind of compression in the difference image that corresponds to what is achieved by applying the static subframe mosaic algorithm (described in FIG. 13) to image P but at a fraction of its cost in performance. Purpose (2) is achieved by applying a very low threshold η≥0 to Q such that, for each value v in Q, if v≤η, v is replaced with 0. The resulting array Q' now replaces Q as a link in the temporally compressed chain that first replaced P.

At this point, the simplified difference array Q' replaces the original level 1 image P for encoding and transmission and storage. The decoder will later be instructed to add this difference image Q' to the previous level 1 image $P_0$ to recreate an approximation of the current original level 1 image P. The major reason for this replacement is the usually lower entropy of Q' and therefore greater coding efficiency and enhanced image space compression.

In this embodiment, there is no further multi-frame processing on this level (532), and processing continues step 536, where the values of pertinent internal parameters may computed or updated. Processing continues to the WT iteration decision 540, which in this embodiment is rejected.

However, in one or more other embodiments, the XOR differencing and related operations described above are postponed, and the processing continues, with each successive level dividing the area of the preview and its support space once more by four. The concentration of essential data in the preview continues, but with each iteration, the importance of support space data increases. Various measures are taken to preserve quality and control further compression at higher levels, including the use of smaller and smaller thresholds θ for eliminating support data until adequate compression is achieved. In one or more embodiments, said XOR and related operations are applied only to the highest level previews if at all.

In this embodiment, the step 540 wavelet iteration decision becomes NO, and processing continues with step 544, where such data as image P which is required for later multi-frame processing (as $P_0$) is temporarily preserved. Processing continues to step 552, where the reduced XOR substitute Q' for the level 2 image and every level support space (in the present case, this is only the reduced level 2 support) is compressed losslessly, using such appropriate lossless compression functions as RLE. The decision in step 556 ensures that other data channels are similarly processed. Finally, the processing of that video frame is complete, and the decision in step 560 continues processing with step 512, where the next video frame is imported for processing.

Processing continues until the last video frame is processed, and the process comes to an end with step 564.

This final example describes three more implemented embodiments of systems and methods of wavelet and channel-based high definition video encoding. These embodiments are designed to isolate and illustrate the relative contribution of three important methods of said systems and methods. The combined contribution of these methods is visually presented in FIG. 12. If the process described in Example 2 were applied to the original video frames used in Example 3 below, the level 2 preview and support space would have appeared exactly as shown in FIGS. 12B and 12D.

Example 3

Impact of Unconditional Level 1 Zero-Substitution, a Level 1 Noise Filter, and Conditional Level 2 Substitution on Two-Level Wavelet Encoding Compressibility The purpose of this example is to illustrate both the absolute and relative effectiveness of Process 1: unconditional replacement of all level 1 support data with zeroes, Process 2: conditional replacement of level 2 support data with zeroes, without the use of Process 3, a level 1 noise filter, and Process 3: conditional replacement of level 2 support data with zeroes only after Process 3, a noise filter applied to the level 1 image.

In one or more embodiments of systems and methods of wavelet and channel-based high definition video encoding, the use of a level 1 noise filter is followed by unconditional level 1 zero substitution and conditional level 2 zero substitution. This example describes and illustrates actual results obtained from applying combinations of these methods to the Y color channel of an exemplary video frame from each of eight different video clips. Industry experts would consider all but one of these examples (Black Beauty) to present difficult to extremely difficult compression problems. Because the techniques are single-frame, there was no need to examine more than one frame from each video. However, in order ensure that our data is representative, a sequence of six of the most challenging video frames was selected from each video to generate the mean values in TABLES 1, 2, and 3 below.

Proc. 1, Unconditional replacement of level 1 support data with zeroes.

Every example starts by applying the D4 wavelet transform to the original level 0 image (i.e., the video frame). Only the level 1 preview was generated. No level 1 support data were generated because they are known to be replaced by zeroes, as described in SFC—Unconditional replacement.

The effect of this process is seen in TABLE 1. Given that the 1080p HD level 1 support space has 1.56 million support space coefficients, column 2 shows an average initial population of 100 to 372 thousand level 1 support coefficients that are quantized as non-zero, a percentage range from 6% to 24%. There is so much visual redundancy in the original image that massive data replacement of the remaining non-zero support data with zeroes is seen to have practically no visual impact on the resulting decoded HD video. (Recall that in this embodiment, neither edge data capture nor any other technique is used. Apart from quantization, column 2 of TABLE 1 represents a lossless wavelet transformation, while column 4 represents the complete elimination of all support data.)

Process 2, conditional replacement of level 2 support data with zeroes without the use of a level 1 noise filter.

In this case, after the first application of the D4 wavelet transform, the WT is immediately applied to the level 1 image. The number of non-zero data present in the resulting level 2 support space is shown in TABLE 2, column 2. Column 3 shows that the portion of level 2's 388,800 support coefficients that are quantized as non-zero, ranges from 19% to 53% before applying Process 2, the threshold filter of this embodiment described in SFC—Conditional substitution.

Column 4 shows the number of level 2 non-zero coefficients after the threshold filter has been applied, while column 5 shows the percentage of non-zero level 2 support data remaining after Process 2 has been applied.

Process 3, the level 1 noise filter, followed by the WT and Process 2, the level 2 threshold filter.

In this embodiment, the noise filter is applied to the level 1 image before the D4 wavelet transform. As shown in TABLE 2, column 6, the effectiveness of Process 2 is improved significantly. This is more apparent when the percentages of remaining non-zero support data in column 7 are compared to those of column 4.

TABLE 3 shows the relative impact each of the three methods by indicating the amount of data saved by each method as a fraction of the sum of the initial non-zero level 2 and level 3 support data. Clearly, unconditional level 1 support data replacement is by far the strongest contributor to total zero replacement, followed by conditional level 2 replacement and, lastly, the prior use of the level 1 noise filter.

This analysis underestimates the actual contribution of the noise filter to final compressibility, however. In this embodiment, final compression is achieved by run length encoding. If one views the level 2 HH support spaces found in the lower right quadrant of FIGS. 12B and 12D, for example, one sees how sparse level 2 support quadrants can be at this point. Now imagine the RLE process, recording long strings a zeroes with a single value. Zero replacement of the endpoint of such a run typically doubles the run on the average. Thus, as non-zero data becomes sparse, each additional data replaced contributes an exponential incremental gain to the data content per RLE value.

The last column summarizes the total impact of Processes 1, 2, and 3 by representing the remaining non-zero level 1 and level 2 support data as a percentage of the total non-zero level 1 and level 2 data that would have existed without the application of any of the processes. Percentages that range from 1.5 to 4.4 were observed.

Example 4

Figures Displaying Non-Zero Level 2 Support Space Locations of Two Examples Referenced in TABLES 2 and 3

Figure 12A:
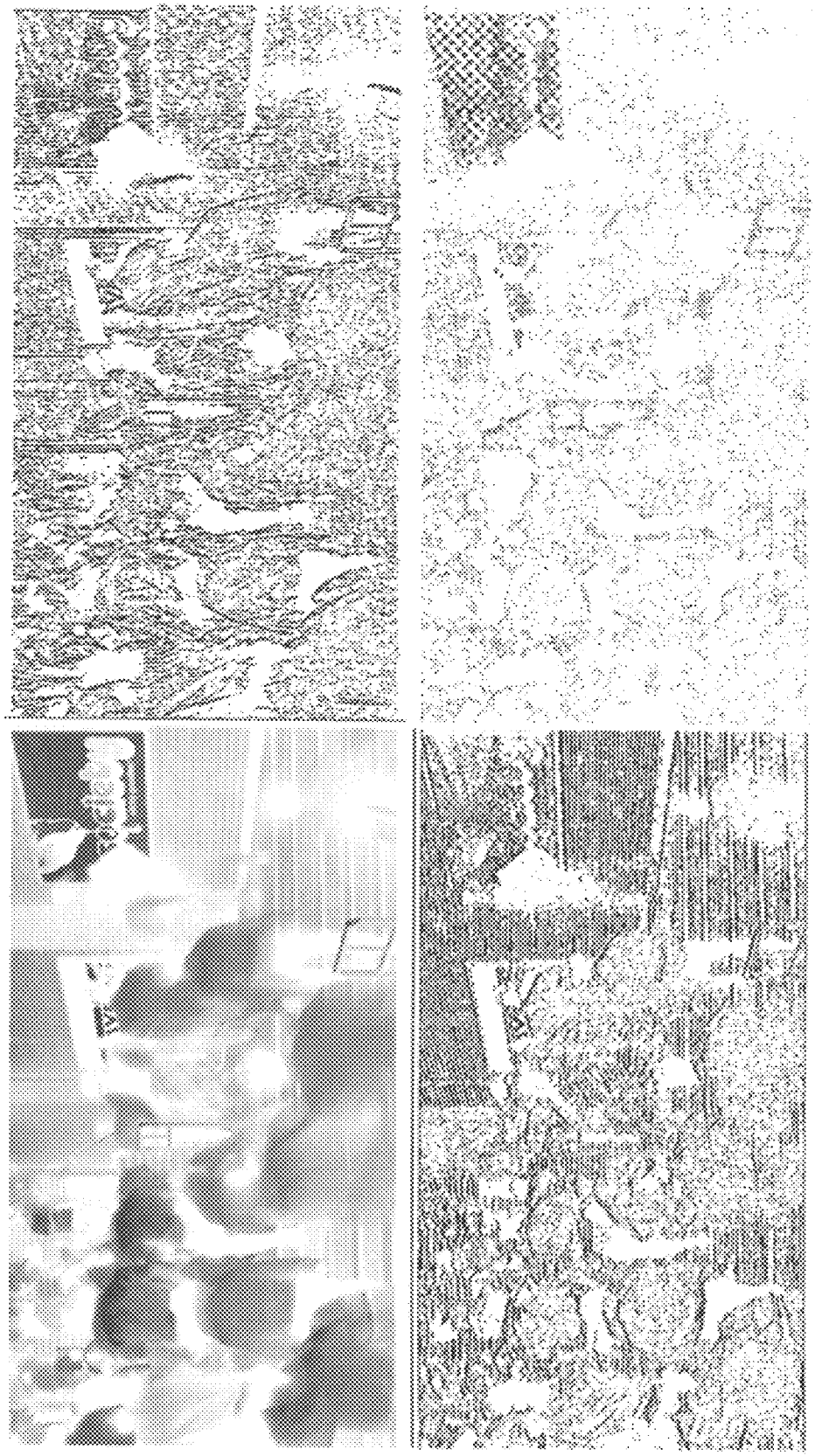
FIG. 12A-12D are exemplary pictures of two pairs of actual level 2 wavelet space representations of a pair of video frames, one pair showing the lossless wavelet spaces, the other showing the wavelet spaces after three methods of one embodiment of systems and methods of wavelet and channel-based high definition video encoding have been applied.
Figure 12B:
Figure 12C:
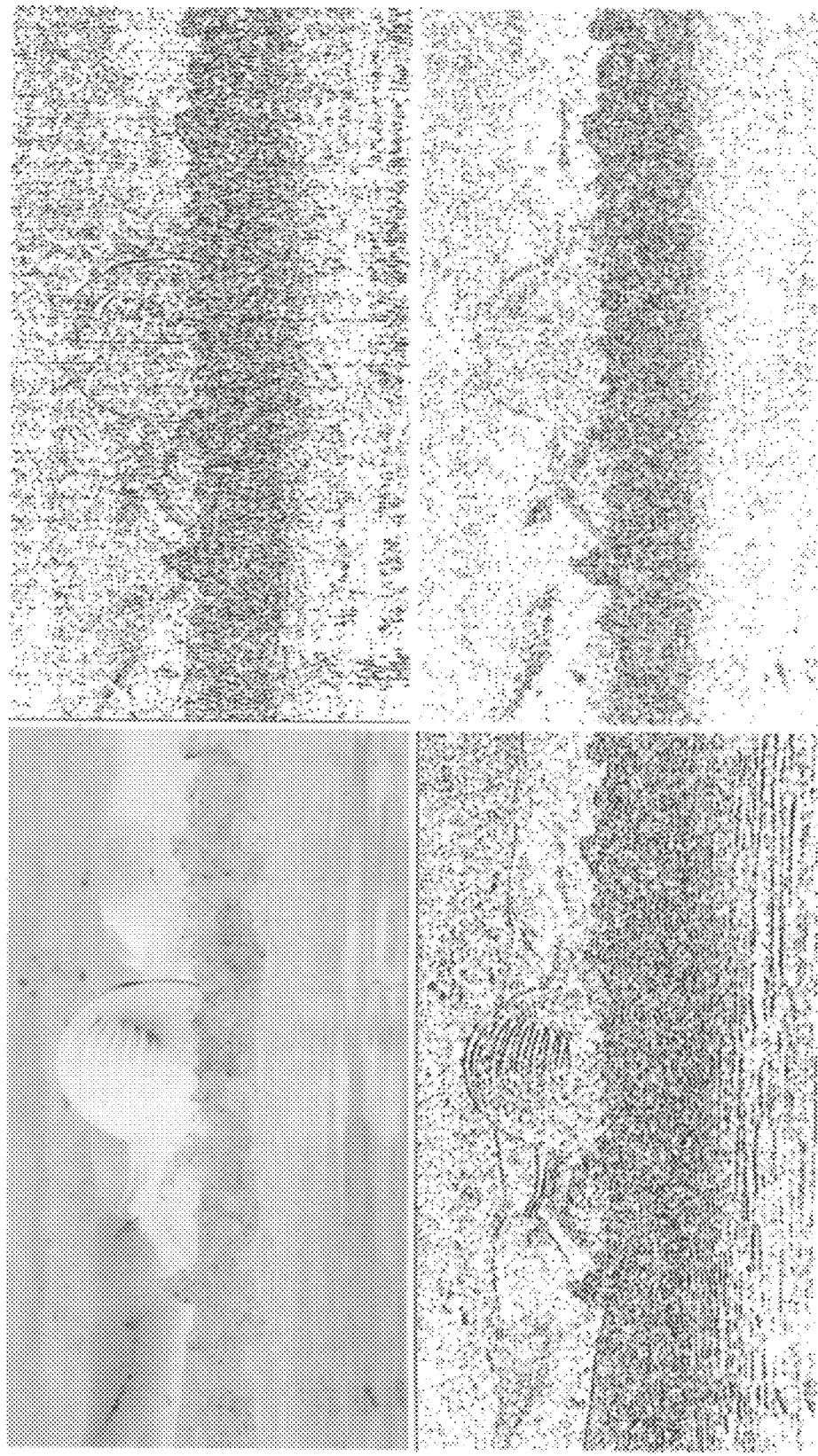
Figure 12D:

FIGS. 12A, 12B, 12C, and 12D each display four quadrants of a level 2 wavelet space. FIGS. 12A and B show Gamer (row 5 of TABLES 2 and 3) and FIGS. 12C and D show Swimmer (row 6 of TABLES 2 and 3). Each quadrant is shown as a negative so that zeroes are represented as white-on-white, while non-zeroes are clearly seen as black on white.

In each case, the upper left quadrant is a negative of the preview (LL), the upper right is the HL support quadrant, the lower right is the HH support quadrant, and the lower left is the LH support quadrant.

FIG. 12A shows what the level 2 wavelet space of Gamer would be if the two applications of the D4 wavelet transform were applied losslessly apart from quantization. The large amount of non-zero data in every support quadrant readily suggest the role of the quadrant as having something to do with horizontal, vertical or diagonal data. Gamer is a compression challenge because of the unusually large amount and kind of detail that pervades nearly every scene.

FIG. 12B shows the level 2 wavelet space of Gamer when all three processes have been applied. The non-zero data is now so sparse that it can be counted manually, at least in the HH quadrant. The HH quadrant, especially, suggests the value of even small enhancements in zero replacement.

FIG. 12C shows what the level 2 wavelet space of Swimmer would be if the two applications of the D4 wavelet transform were applied losslessly. Swimmer is a compression challenge because of the highly random nature of the surface of the water. Two of the support quadrants look 'busier' than the original image. This randomness translates into unusually high values of a great deal of support data.

FIG. 12D shows what the level 2 wavelet space of Swimmer is if all three processes have been applied. In spite of the challenging nature of the data, the processes reduce it to half of what was left over in the Gamer.

These examples are typical of what is considered by video experts as representative of the most difficult compression challenges facing high definition video encoding. The results are typical of one or more embodiments of systems and methods of wavelet and channel-based high definition video encoding.

TABLE 1

Number of Non-Zero Coefficients in Level 1 Support Space With and Without Proc. 1, Unconditional Substitution Column

| (1) Source video | (2) 1000s Non-0s without unconditional subst. | (3) % Non-0s without unconditional subst. | (4) # Non-0s with unconditional subst. |
|---|---|---|---|
| 1. Black Beauty | 372 | 24 | 0 |
| 2. Brothers | 100 | 6 | 0 |
| 3. The Way Home | 373 | 24 | 0 |
| 4. I Can Do Bad By Myself | 158 | 10 | 0 |
| 5. Gamer | 133 | 9 | 0 |
| 6. Swimmer | 333 | 21 | 0 |
| 7. Terminator | 150 | 10 | 0 |
| 8. Wave | 192 | 12 | 0 |
| Overall average: | 226 | 15% | 0 |

TABLE 2

Number of Non-Zero Coefficients in Level 2 Support Space With and Without Proc. 2, Conditional Substitution and Proc. 3, Preliminary Level 1 Noise Reduction Column

| (1) Video | (2) Without any reduction ×1000 | (3) % | (4) With proc. 2, without alg. 3 ×1000 | (5) % | (6) With both proc. 2 & proc.3 ×1000 | (7) % |
|---|---|---|---|---|---|---|
| 1 | 205 | 53 | 45 | 12 | 28 | 7 |
| 2 | 73 | 19 | 9 | 2 | 4 | 1 |
| 3 | 201 | 52 | 39 | 10 | 17 | 4 |
| 4 | 113 | 29 | 8 | 2 | 7 | 2 |
| 5 | 146 | 38 | 18 | 5 | 15 | 4 |
| 6 | 161 | 41 | 18 | 5 | 15 | 4 |
| 7 | 180 | 46 | 7 | 2 | 7 | 2 |
| 8 | 185 | 47 | 16 | 4 | 14 | 3 |
| Overall avg: | 158 | 1% | 20 | 5% | 13 | 3% |

TABLE 3

Comparative Effectiveness of Processes 1, 2, and 3 in Data Reduction Column

| (1) Video | (2) % total reduction due to Proc. 1 | (3) Proc. 2 | (4) Proc. 3 | (5) % of original non-0s still non-0 after proc. 1, 2, & 3. |
|---|---|---|---|---|
| 1 | 87.0 | 11.7 | 1.3 | 4.6 |
| 2 | 95.5 | 4.2 | 0.3 | 2.7 |
| 3 | 86.5 | 11.9 | 1.6 | 2.9 |
| 4 | 92.9 | 7.0 | 0.1 | 2.5 |
| 5 | 91.6 | 8.3 | 0.2 | 3.0 |
| 6 | 89.4 | 10.4 | 0.0 | 1.9 |

TABLE 3-continued

Comparative Effectiveness of Processes 1, 2, and 3 in Data Reduction Column

| (1) Video | (2) % total reduction due to Proc. 1 | (3) Proc. 2 | (4) Proc. 3 | (5) % of original non-0s still non-0 after proc. 1, 2, & 3. |
|---|---|---|---|---|
| 7 | 89.0 | 11.0 | 0.1 | 3.4 |
| 8 | 88.9 | 11.0 | 0.5 | 3.3 |
| Overall Avg: | 90.2% | 9.4% | 0.5% | 3.3% |

What is claimed is:

1. A method for wavelet and channel-based video encoding comprising:
   selecting an input video frame from a digital video data stream comprising a plurality of video frames;
   applying a wavelet transform n times to said at least one channel of said input video frame to generate wavelet space data comprising level n preview data and levels 1 through n support space data for said input video frame, wherein n is an integer greater than zero;
   generating compressed support space data by compressing said support space data;
   iteratively applying inverse of said wavelet transform n times to said level n preview data and said compressed support space data to obtain at least one modified level 0 image;
   generating a pixel-by-pixel difference frame between said input video frame and said at least one modified level 0 image;
   applying a filter to said pixel-by-pixel difference frame to generate an edge-image data;
   generating compressed and encoded edge-image data by compressing and encoding said edge-image data; and
   combining said compressed support space data and said compressed and encoded edge-image data to generate an output video data.

2. The method of claim 1, wherein said encoding comprises run length encoding.

3. The method of claim 1, wherein said encoding comprises entropy encoding.

4. The method of claim 1, further comprising applying a noise reduction filter to said input video frame prior to the application of said wavelet transform to increase said compression of said support space data.

5. The method of claim 1, wherein said filter is a high spatial frequency filter.

6. The method of claim 1, wherein said filter is a constant k filter.

7. The method of claim 1, wherein said filter replaces the values of non-edge points in said difference frame to generate said edge-image data.

8. A method for wavelet and channel-based video encoding comprising:
   obtaining a digital video data comprising a plurality of m input video frames, where m>1;
   applying a wavelet transform n times to each one of said plurality of input video frames to generate wavelet space data comprising level n preview data $P_1$ to $P_m$ and corresponding support space data for said plurality of input video frames, where n>0;
   generating an image difference data $Q_i$ by differencing between $P_i$ and $P_{i-1}$ where i is from 2 to m;
   generating compressed and encoded image difference data $Q'_i$ by compressing and encoding said image difference data $Q_i$;
   generating compressed and encoded support space data by compressing and encoding said support space data; and
   combining said compressed and encoded support space data, said $P_1$ and said compressed and encoded image difference data $Q'_i$ to generate an output video data.

9. The method of claim 8, wherein said differencing is the arithmetic difference between $P_i$ and (i.e., $P_i-P_{i-1}$).

10. The method of claim 9, wherein a decoder regenerates said level n preview data $P_1$ to $P_m$ follows:
    decoding and uncompressing said compressed and encoded image difference data $Q'_i$ to regenerate said image difference data $Q_i$; and
    regenerating the level n preview data with the equation $P_i=P_{i-1}+Q_i$.

11. The method of claim 8, wherein said encoding is lossless compression.

12. The method of claim 8, wherein said differencing is the EXCLUSIVE OR ($\oplus$) of $P_i$ and $P_{i-1}$ (i.e., $P_i \oplus P_{i-1}$).

13. The method of claim 12, wherein a decoder regenerates said level n preview data $P_1$ to $P_m$ follows:
    decoding and uncompressing said compressed and encoded image difference data $Q'_i$ to regenerate said image difference data $Q_i$; and
    regenerating the level n preview data with the equation $P_i=P_{i-1} \oplus Q_i$.

14. The method of claim 12, wherein said generating said compressed support space data further comprises:
    determining a threshold value $\theta$ for said support space data, where $\theta$ is greater than zero; and
    replacing each datum value v in each of said support space data with zero if absolute value of said datum v is less than or equal to the threshold value $\theta$.

15. A method for wavelet and channel-based video encoding comprising:
    obtaining digital video data comprising a plurality of input video frames $X_0$ to $X_m$, where m>0;
    applying a wavelet transform n times to input video frame $X_0$ to generate initial wavelet space data $W_0$, where n>0;
    generating an image difference data Z by differencing between input video frames $X_i$ and $X_{i-1}$, where i is from 1 to m;
    applying said wavelet transform said n times to said image difference data $Z_i$ to generate a difference wavelet space data $W_i$ comprising a preview data quadrant $Q_{LL}$ and corresponding support data quadrants $Q_{LH}$, $Q_{HL}$, and $Q_{HH}$;
    determining a threshold value $\theta$ for said support quadrants data, where $\theta$ is greater than zero;
    generating a modified wavelet space data $W'_i$ by replacing each datum value v in each of said support quadrants of said difference wavelet space data $W_i$ with zero if absolute value of said datum v is less than or equal to the threshold value $\theta$;
    generating compressed and encoded modified wavelet space data $Y_i$ by compressing and encoding said modified wavelet space data $W'_i$; and
    outputting said initial wavelet space data $W_0$ and said compressed and encoded modified wavelet space data $Y_i$.

16. The method of claim 15, wherein said threshold value $\theta$ is determined by factors such as desired video quality, video display device, target compression ratio and allotted bandwidth.

17. The method of claim 15, wherein said encoding comprises run length encoding.

18. The method of claim 15, wherein said encoding comprises entropy encoding.

19. The method of claim 15, further comprising encoding said initial wavelet space data $W_0$ prior to said outputting step.

20. The method of claim 15, wherein a decoder generates an approximation of said input video frames $X_0$ to $X_m$ as follows:
- applying inverse of said wavelet transform said n times to said initial wavelet space data $W_0$ to generate an approximation $\hat{X}_0$ of the initial input video frame;
- decoding said compressed and encoded modified wavelet space data $Y_i$ to generate said modified wavelet space data $\hat{W}_i$;
- applying inverse of said wavelet transform said n times to said modified wavelet space data $\hat{W}_i$ to generate image difference data $\hat{Z}_i$;
- generating an approximation $\hat{X}_1$ to $\hat{X}_m$ of the input video frames with the equation $\hat{X}_i = \hat{X}_{i-1} + \hat{Z}i$.

* * * * *